(12) United States Patent
Yamashita et al.

(10) Patent No.: US 10,564,463 B2
(45) Date of Patent: Feb. 18, 2020

(54) TOUCH PANEL-ATTACHED DISPLAY DEVICE AND METHOD FOR MANUFACTURING TOUCH PANEL-ATTACHED DISPLAY DEVICE

(71) Applicant: SHARP KABUSHIKI KAISHA, Sakai, Osaka (JP)

(72) Inventors: Tetsuya Yamashita, Sakai (JP); Yoshihito Hara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 115 days.

(21) Appl. No.: 15/743,394

(22) PCT Filed: Aug. 12, 2016

(86) PCT No.: PCT/JP2016/073700
§ 371 (c)(1),
(2) Date: Jan. 10, 2018

(87) PCT Pub. No.: WO2017/030080
PCT Pub. Date: Feb. 23, 2017

(65) Prior Publication Data
US 2018/0203280 A1   Jul. 19, 2018

(30) Foreign Application Priority Data

Aug. 19, 2015   (JP) ................. 2015-161960

(51) Int. Cl.
*G02F 1/133*   (2006.01)
*G06F 3/047*   (2006.01)
(Continued)

(52) U.S. Cl.
CPC ........ *G02F 1/13338* (2013.01); *G02F 1/1368* (2013.01); *G02F 1/134309* (2013.01);
(Continued)

(58) Field of Classification Search
CPC .................. G02F 1/13338–134363; G02F 2201/121–123; G06F 3/041;
(Continued)

(56) References Cited

U.S. PATENT DOCUMENTS 8,619,225 B2 * 12/2013 Fujita ................ G02F 1/134363
349/141
2009/0128757 A1 * 5/2009 Koshihara ......... G02F 1/133555
349/114

(Continued)

FOREIGN PATENT DOCUMENTS

JP   2015-106411 A   6/2015

*Primary Examiner* — Lin Li
(74) *Attorney, Agent, or Firm* — ScienBiziP, P.C.

(57) ABSTRACT

To improve sensing sensitivity of a touch panel. A touch panel-attached display device includes an active matrix substrate 1, a counter substrate, and a liquid crystal layer. On the active matrix substrate 1, a TFT (display control element) 42, a first insulating film 44, a plurality of pixel electrodes 31, a second insulating film 46, and a counter electrode 21 are laminated in order. In the active matrix substrate 1, a control unit which detects a touch position by supplying a touch driving signal to a plurality of counter electrodes 21, and a touch sensor wiring 22 which is formed between the first insulating film 44 and the second insulating film 46, which connects the control unit and the counter electrode 21, and which is for supplying the touch driving signal from the control unit to the counter electrode 21, are also formed. A thickness of a portion in the second insulating film 46 formed between the counter electrode 21 and the touch sensor wiring 22 is thicker than a thickness of a portion formed between the pixel electrode 31 and the counter electrode 21.

13 Claims, 14 Drawing Sheets

(51) Int. Cl.
  *G06F 3/041* (2006.01)
  *G02F 1/1333* (2006.01)
  *G06F 3/044* (2006.01)
  *G02F 1/1368* (2006.01)
  *G02F 1/1343* (2006.01)
  *G02F 1/1362* (2006.01)

(52) U.S. Cl.
  CPC ........ *G02F 1/136286* (2013.01); *G06F 3/044* (2013.01); *G06F 3/0412* (2013.01); *G02F 2001/134372* (2013.01); *G02F 2201/121* (2013.01); *G02F 2201/123* (2013.01); *G06F 2203/04103* (2013.01)

(58) Field of Classification Search
  CPC .................. G06F 3/0412; G06F 3/044; G06F 2203/04103; H01L 24/14
  See application file for complete search history.

(56) References Cited

U.S. PATENT DOCUMENTS

| | | | |
|---|---|---|---|
| 2011/0102359 A1* | 5/2011 | Chiba | G02F 1/13338 345/173 |
| 2013/0162570 A1* | 6/2013 | Shin | G06F 3/041 345/173 |
| 2015/0145821 A1 | 5/2015 | Kim et al. | |
| 2015/0279798 A1* | 10/2015 | Park | H01L 24/14 257/737 |
| 2016/0041666 A1* | 2/2016 | Lee | G02F 1/13338 345/174 |
| 2016/0188040 A1* | 6/2016 | Shin | G06F 3/047 345/174 |
| 2016/0291749 A1* | 10/2016 | Zhou | G06F 3/0412 |
| 2017/0090644 A1* | 3/2017 | Yao | G06F 3/0416 |
| 2017/0168619 A1* | 6/2017 | Yang | G06F 3/0412 |

* cited by examiner

TOUCH PANEL-ATTACHED DISPLAY DEVICE AND METHOD FOR MANUFACTURING TOUCH PANEL-ATTACHED DISPLAY DEVICE

TECHNICAL FIELD

The present invention relates to a touch panel-attached display device and a method for manufacturing the same.

BACKGROUND ART

PTL 1 discloses a touch sensor integrated type display device. In this touch sensor integrated type display device, a plurality of common electrodes, which oppose pixel electrodes, also function as touch driving electrodes and touch sensing electrodes forming the touch sensor.

CITATION LIST

Patent Literature

PTL 1: Japanese Unexamined Patent Application Publication No. 2015-106411

SUMMARY OF INVENTION

Technical Problem

However, since a touch sensor wiring in the touch sensor integrated type display device described in PTL 1 is arranged in the same layer as a gate electrode of a TFT which is a display control element, that is, at a position far from the panel surface, the sensing sensitivity of the touch sensor is lowered.

It is an object of the present invention to provide a technique for improving the sensing sensitivity of a touch panel.

Solution to Problem

A touch panel-attached display device according to an embodiment of the present invention includes an active matrix substrate, a counter substrate opposing the active matrix substrate, a liquid crystal layer interposed between the active matrix substrate and the counter substrate, a display control element formed on the active matrix substrate, a first insulating film formed on the active matrix substrate further to the liquid crystal layer side than the display control element, a plurality of pixel electrodes formed on the active matrix substrate further to the liquid crystal layer side than the first insulating film, a second insulating film formed on the active matrix substrate further to the liquid crystal layer side than the plurality of pixel electrodes, a plurality of counter electrodes formed on the active matrix substrate further to the liquid crystal layer side than the second insulating film and forming an electrostatic capacitance between each of the counter electrodes and each of the pixel electrodes, a control unit which is provided on the active matrix substrate and which detects a touch position by supplying a touch driving signal to the plurality of counter electrodes, and a touch sensor wiring formed between the first insulating film and the second insulating film, which connects the control unit and the counter electrode, and which is for supplying the touch driving signal from the control unit to the counter electrode, in which, in the second insulating film, a thickness of a portion formed between the counter electrode and the touch sensor wiring is thicker than that of a portion formed between the pixel electrode and the counter electrode.

Advantageous Effects of Invention

According to the disclosure of the present embodiment, the touch sensor wiring is arranged between the first insulating film and the second insulating film at a position closer to the surface of the display device than the layer where the display control element is formed. Due to this, it is possible to improve the sensing sensitivity of the touch panel compared to a configuration in which the touch sensor wiring is arranged in the same layer as the display control element. In addition, since a thickness of a portion formed between the counter electrode and the touch sensor wiring in the second insulating film is thicker than that of a portion formed between the pixel electrode and the counter electrode, it is possible to reduce parasitic capacitance between the counter electrode and the touch sensor wiring. Due to this, it is possible to improve the sensing sensitivity of the touch panel.

DESCRIPTION OF EMBODIMENTS

Figure 1:
FIG. 1 is a cross-sectional diagram of a touch panel-attached display device according to an embodiment.

A touch panel-attached display device according to an embodiment of the present invention is provided with an active matrix substrate; a counter substrate opposing the active matrix substrate; a liquid crystal layer interposed between the active matrix substrate and the counter substrate; a display control element formed on the active matrix substrate; a first insulating film formed on the active matrix substrate further to the liquid crystal layer side than the display control element; a plurality of pixel electrodes formed on the active matrix substrate further to the liquid crystal layer side than the first insulating film; a second insulating film formed on the active matrix substrate further to the liquid crystal layer side than the plurality of pixel electrodes; a plurality of counter electrodes formed on the active matrix substrate further to the liquid crystal layer side than the second insulating film and forming an electrostatic capacitance between each of the counter electrodes and each of the pixel electrodes; a control unit which is provided on the active matrix substrate and which detects a touch position by supplying a touch driving signal to the plurality of counter electrodes; and a touch sensor wiring formed between the first insulating film and the second insulating film, which connects the control unit and the counter electrode, and which is for supplying the touch driving signal from the control unit to the counter electrode, in which, in the second insulating film, a thickness of a portion formed between the counter electrode and the touch sensor wiring is thicker than that of a portion formed between the pixel electrode and the counter electrode (first configuration).

According to the first configuration, the touch sensor wiring is arranged between the first insulating film and the second insulating film and at a position closer to the surface of the display device than the layer in which the display control element is formed. Due to this, it is possible to improve the sensing sensitivity of the touch panel compared to a configuration in which the touch sensor wiring is arranged in the same layer as the display control element. In addition, since, in the second insulating film, a thickness of a portion formed between the counter electrode and the touch sensor wiring is thicker than that of a portion formed between the pixel electrode and the counter electrode, it is possible to reduce the parasitic capacitance between the counter electrode and the touch sensor wiring. Due to this, it is possible to improve the sensing sensitivity of the touch panel. In addition, since the thickness of the second insulating film between the pixel electrode and the counter electrode is thin, the capacitance between the pixel electrode and the counter electrode is increased, which improves the charge holding property, thus, the display performance is improved.

There may be a configuration (second configuration) in which, in the first configuration, a portion in the second insulating film, which is formed between the counter electrode and the touch sensor wiring, is formed of two insulating film layers, and a portion formed between the pixel electrode and the counter electrode is formed of one insulating film layer.

According to the second configuration, it is possible to easily change the film thickness compared to a configuration in which the film thickness of the second insulating film formed of one insulating film layer is changed depending on the location. That is, since it is sufficient if the portion formed between the counter electrode and the touch sensor wiring is set to be two insulating film layers, and the portion formed between the pixel electrode and the counter electrode is set to be one insulating film layer, it is possible to easily change the film thickness.

It is possible to have a configuration (third configuration) in which, in the second configuration, the two insulating film layers include an insulating film formed of a first material and an insulating film formed of a second material having a higher etching rate than that of the first material, and the insulating film formed of the second material is formed on the liquid crystal layer side with respect to the insulating film formed of the first material.

According to the third configuration, by forming the insulating film formed of the second material with a high etching rate as an upper layer, after forming the insulating film formed of the first material and the insulating film formed of the second material, it is possible to easily remove only the insulating film formed of the second material with a high etching rate by etching in a portion between the pixel electrode and the counter electrode.

It is possible to have a configuration (fourth configuration) in which, in the third configuration, the first material is silicon nitride and the second material is silicon oxide.

There may be a configuration (fifth configuration) in which, in the first configuration, a portion in the second insulating film formed between the counter electrode and the touch sensor wiring is formed of three or more insulating film layers, and a portion formed between the pixel electrode and the counter electrode is formed of one insulating film layer.

According to the fifth configuration, since it is possible to increase the thickness of the second insulating film between the counter electrode and the touch sensor wiring, parasitic capacitance between the counter electrode and the touch sensor wiring is further reduced and it is possible to further improve the sensing sensitivity of the touch panel.

There may be a configuration (sixth configuration) in which any one of the first to fifth configurations further includes a conductive film which is provided between the touch sensor wiring and the first insulating film and is formed of an identical material as the pixel electrode.

According to the sixth configuration, providing a conductive film formed of the same material as the pixel electrode between the touch sensor wiring and the first insulating film makes it possible to improve the adhesion between the touch sensor wiring and the first insulating film.

There may be a configuration (seventh configuration) in which any one of the first to sixth configurations is further provided with a planarizing film formed between the first insulating film and the pixel electrode.

Providing the planarizing film makes it possible to widen the interval between the touch sensor wiring and the gate wiring and the source wiring. Due to this, since it is possible to further reduce parasitic capacitance between the touch sensor wiring and the gate wiring and the source wiring, it is possible to further improve the sensing sensitivity of the touch panel.

A method for manufacturing a touch panel-attached display device according to an embodiment of the present invention is a method for manufacturing a touch panel-attached display device which is provided with an active matrix substrate, a counter substrate opposing the active matrix substrate, and a liquid crystal layer interposed between the active matrix substrate and the counter substrate, and which has a touch position detection function, the method including a step of forming a display control element on the active matrix substrate; a step of forming a first insulating film so as to cover the display control element after forming the display control element; a step of forming a planarizing film so as to cover the first insulating film after forming the first insulating film; a step of forming a pixel electrode after forming the planarizing film; a step of forming a touch sensor wiring for supplying a touch driving signal after forming the planarizing film; a step of forming a second insulating film after forming the pixel electrode and the touch sensor wiring; and a step of forming a counter electrode to be electrically connected to the touch sensor wiring after forming the second insulating film, in which, in the step of forming a second insulating film, the second insulating film is formed to have a thickness between the pixel electrode and the counter electrode which is thinner than a thickness between the counter electrode and the touch sensor wiring (eighth configuration).

According to the eighth configuration, the touch sensor wiring is arranged between the planarizing film and the second insulating film, at a position closer to the surface of the display device than the layer in which the display control element is formed. Due to this, it is possible to improve the sensing sensitivity of the touch panel compared to a configuration in which the touch sensor wiring is arranged in the same layer as the display control element. In addition, since, in the second insulating film, a thickness of a portion formed between the counter electrode and the touch sensor wiring is thicker than that of a portion formed between the pixel electrode and the counter electrode, it is possible to reduce parasitic capacitance between the counter electrode and the touch sensor wiring. Due to this, it is possible to improve the sensing sensitivity of the touch panel. In addition, since the thickness of the second insulating film between the pixel electrode and the counter electrode is thin, the capacitance between the pixel electrode and the counter electrode is increased, which improves the charge holding property, thus, the display performance is improved.

In the step of forming a second insulating film in the eighth configuration, the second insulating film having a predetermined thickness may be formed (ninth configuration) between the pixel electrode and the counter electrode and between the counter electrode and the touch sensor wiring, and then half-etching may be performed such that the thickness of the second insulating film between the pixel electrode and the counter electrode becomes thinner.

According to the ninth configuration, it is possible to change the film thickness of the second insulating film between the pixel electrode and the counter electrode and of the second insulating film between the counter electrode and the touch sensor wiring by half-etching.

In the step of forming a second insulating film in the eighth configuration, a first layer second insulating film may be formed, a second layer second insulating film may be formed on the first layer second insulating film, and then the first layer second insulating film between the pixel electrode and the counter electrode may be removed by etching (tenth configuration).

According to the tenth configuration, since it is sufficient to remove the first layer second insulating film by etching when thinning the thickness of the second insulating film between the pixel electrode and the counter electrode, it is possible to easily thin the thickness of the second insulating film between the pixel electrode and the counter electrode.

It is possible to, in the tenth configuration, form the second layer second insulating film of a material having a higher etching rate than that of the first layer second insulating film and, in the step of forming a second insulating film, to form the first layer second insulating film and the second layer second insulating film and then remove the second layer second insulating film between the pixel electrode and the counter electrode by etching (eleventh configuration).

According to the eleventh configuration, it is possible to easily remove the second layer second insulating film formed of a material with a high etching rate by etching between the pixel electrode and the counter electrode.

[Embodiments]

A detailed description will be given below of embodiments of the present invention with reference to the drawings. In the drawings, the same or corresponding parts are denoted by the same reference numerals, and description thereof will not be repeated. Here, for ease of explanation, configurations are simplified or schematically shown in the drawings referred to below and some constituent members are omitted. In addition, the dimensional ratios between the constituent members shown in each drawing do not necessarily indicate the actual size ratios.

[First Embodiment]

FIG. 1 is a cross-sectional diagram of a touch panel-attached display device 10 according to one embodiment. The touch panel-attached display device 10 according to one embodiment is provided with an active matrix substrate 1, a counter substrate 2, and a liquid crystal layer 3 interposed between the active matrix substrate 1 and the counter substrate 2. Each of the active matrix substrate 1 and the counter substrate 2 is provided with a glass substrate which is substantially transparent (having a high light-transmitting property). The counter substrate 2 is provided with a color filter (not shown). In addition, although not shown, the touch panel-attached display device 10 is provided with a backlight.

The touch panel-attached display device 10 according to the present embodiment has a function of displaying an image and also has a function of detecting position information (touch position) inputted by a user based on the displayed image. The touch panel-attached display device 10 is provided with a so-called in-cell type touch panel in which wiring and the like necessary for detecting the touch position are formed in the display panel.

In the touch panel-attached display device 10 according to the present embodiment, the driving method of liquid crystal molecules included in the liquid crystal layer 3 is a lateral electric field driving method. In order to realize the lateral electric field driving method, a pixel electrode and a counter electrode (may also be referred to as a common electrode) for forming an electric field are formed in the active matrix substrate 1.

Figure 2:
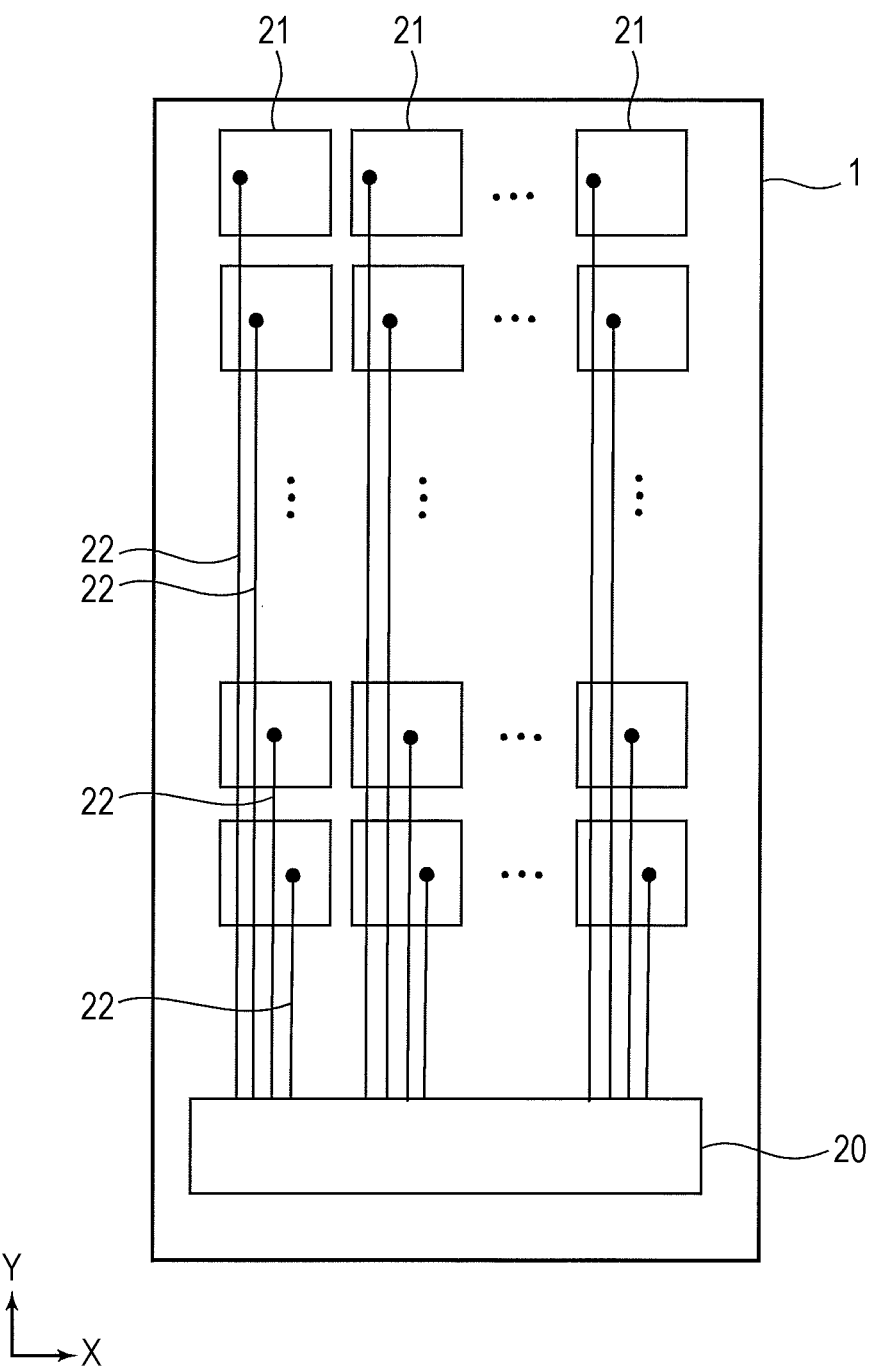
FIG. 2 is a diagram showing an example of an arrangement of counter electrodes formed on an active matrix substrate.

FIG. 2 is a diagram showing an example of the arrangement of counter electrodes 21 formed on the active matrix substrate 1. The counter electrodes 21 are formed on the surface of the active matrix substrate 1 on the liquid crystal layer 3 side. As shown in FIG. 2, the counter electrodes 21 have a rectangular shape and a plurality of the counter electrodes 21 are arranged in a matrix on the active matrix substrate 1.

A controller (control unit) 20 is provided on the active matrix substrate 1. The controller 20 performs control for displaying an image and also performs control for detecting a touch position.

The controller 20 and each counter electrode 21 are connected by a touch sensor wiring 22 extending in the Y axis direction. That is, touch sensor wirings 22 equal in number to the number of the counter electrodes 21 are formed on the active matrix substrate 1.

In the touch panel-attached display device 10 according to the present embodiment, the counter electrode 21 may be used for image display control and may also be used for touch position detection control by forming an electrostatic capacitance in a pair with the pixel electrode.

Parasitic capacitance is formed between the counter electrode 21 and the adjacent counter electrode 21 or the like; however, when a human finger or the like touches the display screen of the display device 10, a capacitance is formed between the counter electrode 21 and the human finger or the like, thus the electrostatic capacitance increases. At the time of the touch position detection control, the controller 20 supplies a touch driving signal to the counter electrode 21 via the touch sensor wiring 22, and receives a touch detection signal via the touch sensor wiring 22. As a result, a change in the electrostatic capacitance is detected, whereby a touch position is detected. That is, the touch sensor wiring 22 functions as a line for transmitting and receiving the touch driving signal and the touch detection signal.

Figure 3:
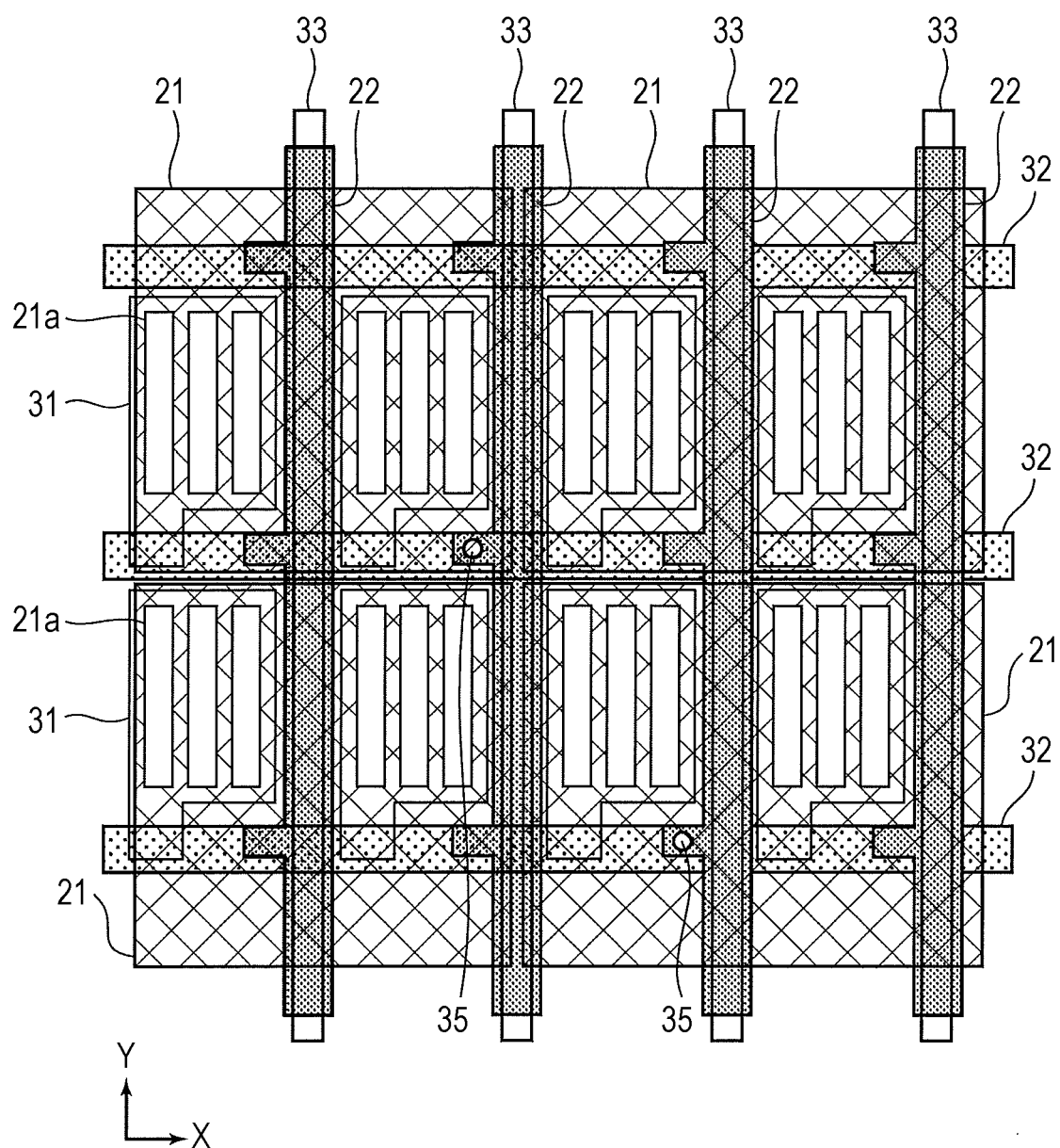
FIG. 3 is an enlarged diagram of a region of a part of the active matrix substrate.

FIG. 3 is an enlarged diagram of a region of a part of the active matrix substrate 1. As shown in FIG. 3, a plurality of pixel electrodes 31 are arranged in a matrix. In addition, although not shown in FIG. 3, thin film transistors (TFT) which are display control elements are also arranged in a matrix corresponding to the pixel electrodes 31. Here, the counter electrode 21 is provided with a plurality of slits 21*a*.

Gate wirings 32 and source wirings 33 are provided around the pixel electrodes 31. The gate wirings 32 extend in the X axis direction and a plurality of gate wirings 32 are provided at predetermined intervals in the Y axis direction. The source wirings 33 extend in the Y axis direction and a plurality of source wirings 33 are provided at predetermined intervals in the X axis direction. That is, the gate wirings 32 and the source wirings 33 are formed in a lattice shape and the pixel electrodes 31 are provided in regions partitioned by the gate wirings 32 and the source wirings 33.

As shown in FIG. 3, the touch sensor wirings 22 extending in the Y axis direction are arranged such that parts thereof overlap with the source wirings 33 extending in the Y axis direction in the normal direction of the active matrix substrate 1. Specifically, the touch sensor wirings 22 are provided in a higher layer than the source wiring 33 and parts of the touch sensor wirings 22 and the source wirings 33 overlap in plan view.

Here, in FIG. 3, white circles 35 indicate portions to which the counter electrode 21 and the touch sensor wiring 22 are connected.

Figure 4:
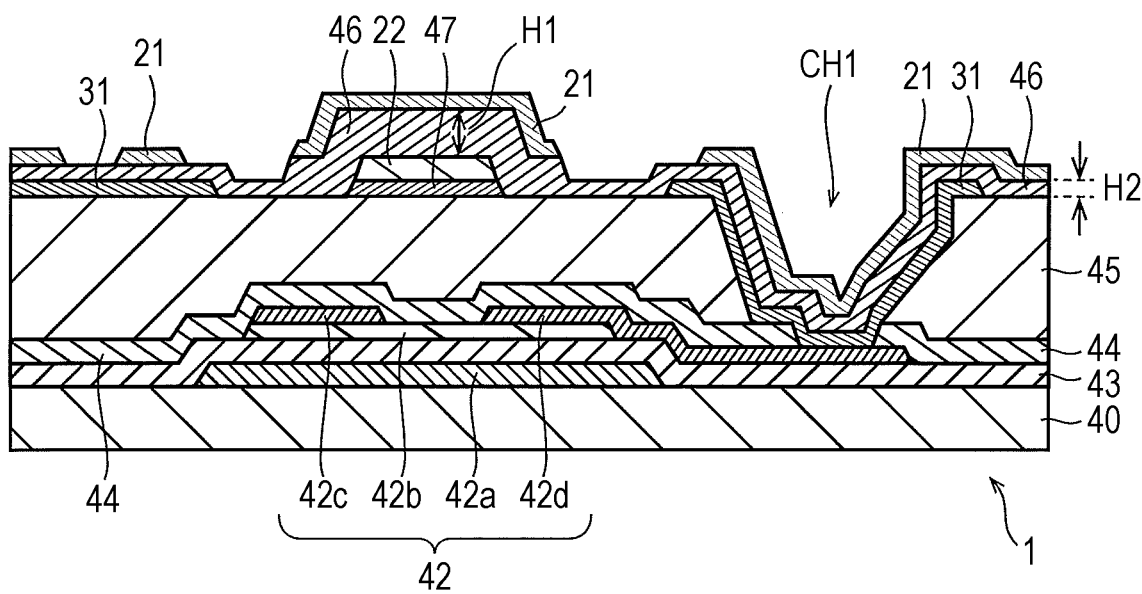
FIG. 4 is a cross-sectional diagram of the active matrix substrate in the first embodiment at a position including a TFT, in a portion in which the counter electrode and a touch sensor wiring are not in contact.
Figure 5:
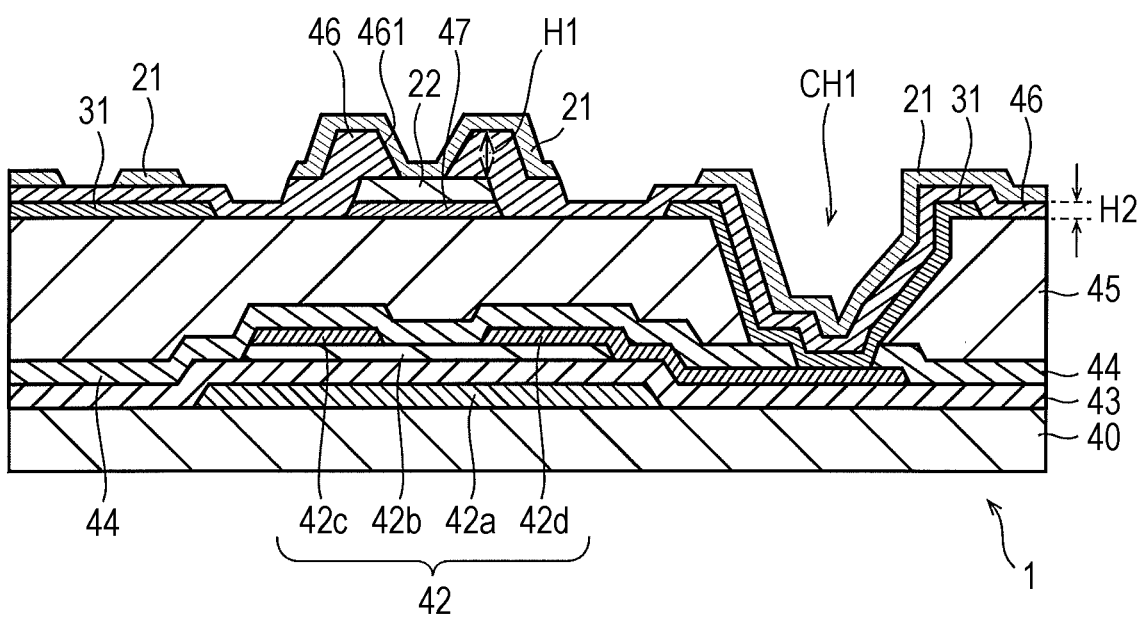
FIG. 5 is a cross-sectional diagram of the active matrix substrate in the first embodiment at a position including the TFT, in a portion in which the counter electrode and the touch sensor wiring are in contact.

FIG. 4 and FIG. 5 are cross-sectional diagrams of the active matrix substrate 1 at the position including a TFT 42 in the first embodiment. FIG. 4 is a cross-sectional diagram of a portion in which the counter electrode 21 and the touch sensor wiring 22 are not in contact. FIG. 5 is a cross-sectional diagram of a portion in which the counter electrode 21 and the touch sensor wiring 22 are in contact.

The TFT 42 is provided as a display control element on a glass substrate 40. The TFT 42 includes a gate electrode 42*a*, a semiconductor film 42*b*, a source electrode 42*c*, and a drain electrode 42*d*.

The gate electrode 42*a* of the TFT 42 is formed on the glass substrate 40. The gate electrode 42*a* is formed of a laminated film of titanium (Ti) and copper (Cu), for example. Although not shown in FIG. 4 and FIG. 5, the gate wiring 32 is also formed on the glass substrate 40 in the same layer as the layer in which the gate electrode 42*a* is formed.

A gate insulating film 43 is formed so as to cover the gate electrode 42*a*. The gate insulating film 43 is formed of, for example, silicon nitride (SiNx) or silicon dioxide ($SiO_2$).

The semiconductor film 42*b* is formed on the gate insulating film 43. The semiconductor film 42*b* is, for example, an oxide semiconductor film and may include at least one kind of metal element from among In, Ga, and Zn. In the present embodiment, the semiconductor film 42*b* includes, for example, an In—Ga—Zn—O-based semiconductor. Here, the In—Ga—Zn—O-based semiconductor is a ternary oxide of In (indium), Ga (gallium), Zn (zinc), and the ratio (composition ratio) of In, Ga, and Zn is not particularly limited and includes, for example, In:Ga:Zn=2:2:1, In:Ga:Zn=1:1:1, In:Ga:Zn=1:1:2, and the like.

The source electrode 42*c* and the drain electrode 42*d* are provided on the semiconductor film 42*b* so as to be separated from each other. The source electrode 42*c* and the drain electrode 42*d* are, for example, formed of a laminated film of titanium (Ti) and copper (Cu). Although not shown in FIG. 4 and FIG. 5, the source wiring 33 is formed in the same layer as the layer in which the source electrode 42*c* is formed.

A first insulating film 44 is formed so as to cover the source electrode 42*c* and the drain electrode 42*d*. The first insulating film 44 is formed of, for example, silicon nitride (SiNx) or silicon dioxide ($SiO_2$).

A planarizing film 45 is formed as an insulator on the first insulating film 44. The planarizing film 45 is formed of, for example, an acrylic resin material such as polymethylmethacrylate resin (PMMA). It is also possible to omit the planarizing film 45.

A pixel electrode 31 is formed on the planarizing film 45. The pixel electrode 31 is a transparent electrode and is formed of a material such as ITO (Indium Tin Oxide), ZnO (Zinc Oxide), IZO (Indium Zinc Oxide), IGZO (Indium Gallium Zinc Oxide), and ITZO (Indium Tin Zinc Oxide).

A conductive film 47 is also formed on the planarizing film 45. The conductive film 47 is a transparent electrode film formed of the same material as the pixel electrode 31 and is provided to improve the adhesion between the touch sensor wiring 22 and the planarizing film 45. Therefore, it is possible to omit the conductive film 47 in a case where the adhesion between the touch sensor wiring 22 and the planarizing film 45 is high.

The touch sensor wiring 22 is formed on the conductive film 47. For example, the touch sensor wiring 22 is formed of any one of copper (Cu), titanium (Ti), molybdenum (Mo), aluminum (Al), magnesium (Mg), cobalt (Co), chromium (Cr), tungsten (W), cadmium (Cd), or a mixture thereof. In a case where the conductive film 47 is omitted, the touch sensor wiring 22 is formed on the planarizing film 45.

The second insulating film 46 is formed so as to cover the pixel electrode 31 and the touch sensor wiring 22. The second insulating film 46 is made of, for example, silicon nitride (SiNx) or silicon dioxide ($SiO_2$).

The counter electrodes 21 are formed on the second insulating film 46. In a portion in which the counter electrode 21 and the touch sensor wiring 22 are connected, an opening 461 is provided in the second insulating film 46, and in the opening 461 portion, the counter electrodes 21 are in contact with the touch sensor wiring 22 (refer to FIG. 5). The counter electrodes 21 are transparent electrodes and are formed of a material such as, for example, ITO, ZnO, IZO, IGZO, ITZO, or the like.

A contact hole CH1 is formed in the first insulating film 44 and the planarizing film 45. The pixel electrode 31 is in contact with the drain electrode 42d of the TFT 42 via the contact hole CH1.

In the present embodiment, as shown in FIG. 4 and FIG. 5, the touch sensor wiring 22 is formed on the planarizing film 45, more specifically, on the conductive film 47. That is, since the touch sensor wiring 22 is arranged at a position close to the panel surface, the sensing sensitivity of the touch sensor is increased compared to a configuration in which the touch sensor wiring is formed in the layer where the TFT 42 is formed, such as the layer in which the gate wiring 32 is formed or the layer in which the source wiring 33 is formed.

In addition, when the touch sensor wiring is formed in the layer in which the gate wiring 32 is formed or in the layer in which the source wiring 33 is formed, since the touch sensor wiring is close to the gate wiring 32 and the source wiring 33, the parasitic capacitance becomes large, and there is a possibility that the sensing sensitivity of the touch panel will be lowered. However, in the present embodiment, since the touch sensor wiring 22 is arranged via the first insulating film 44 and the planarizing film 45 with respect to the gate wiring 32 and the source wiring 33, parasitic capacitance between the touch sensor wiring 22 and the gate wiring 32 and the source wiring 33 is small, and it is possible to suppress a decrease in the sensing sensitivity of the touch panel.

Furthermore, as shown in FIG. 4 and FIG. 5, since the touch sensor wiring 22 is formed so as to partially overlap with the gate electrode 42a, the transmittance does not decrease significantly. For example, when the touch sensor wiring is formed in the same layer as the layer in which the gate electrode 42a is formed, the transmittance decreases in accordance with the touch sensor wiring; however, according to the configuration of the present embodiment, it is possible to improve the transmittance compared to a configuration in which the touch sensor wiring is formed in the same layer as the gate electrode 42a.

Here, in the present embodiment, the thickness of the second insulating film 46 is different between the position where the touch sensor wiring 22 is provided and the position where the pixel electrode 31 is provided. Specifically, a thickness H1 of the second insulating film 46 between the touch sensor wiring 22 and the counter electrode 21 is larger than a thickness H2 of the second insulating film 46 between the pixel electrode 31 and the counter electrode 21. As an example, the thickness H1 of the second insulating film 46 between the touch sensor wiring 22 and the counter electrode 21 is 200 nm, and the thickness H2 of the second insulating film 46 between the pixel electrode 31 and the counter electrode 21 is 100 nm.

Increasing the thickness H1 of the second insulating film 46 between the touch sensor wiring 22 and the counter electrode 21 reduces parasitic capacitance between the touch sensor wiring 22 and the counter electrode 21 and makes it possible to improve the sensing sensitivity of the touch panel. In addition, reducing the thickness H2 of the second insulating film 46 between the pixel electrode 31 and the counter electrode 21 increases the capacitance between the pixel electrode 31 and the counter electrode 21 to improve the charge holding property, whereby it is possible to improve the display performance.

Figure 6:
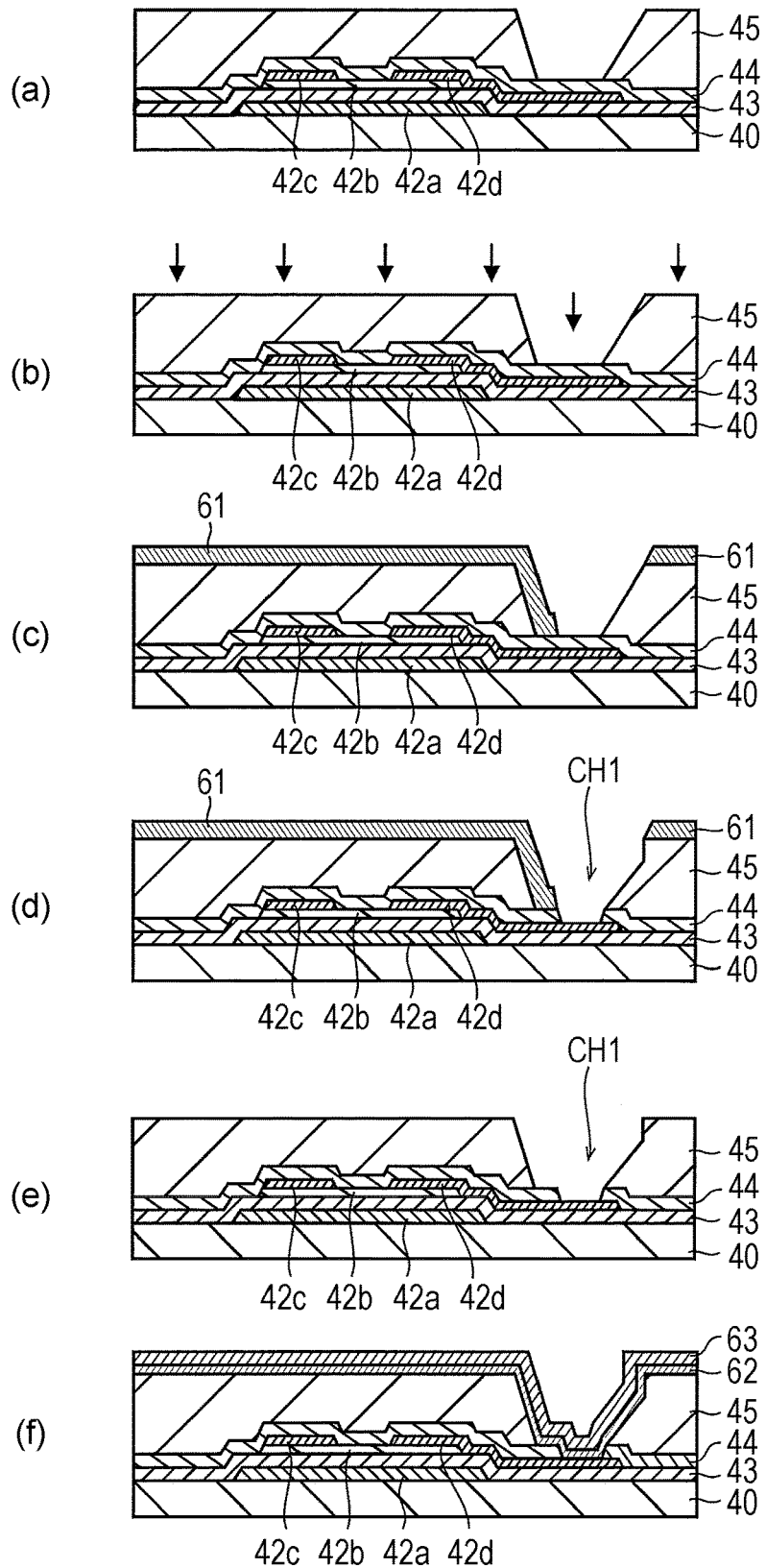
FIG. 6 is a diagram for explaining a manufacturing process of the touch panel-attached display device according to the first embodiment.
Figure 7:
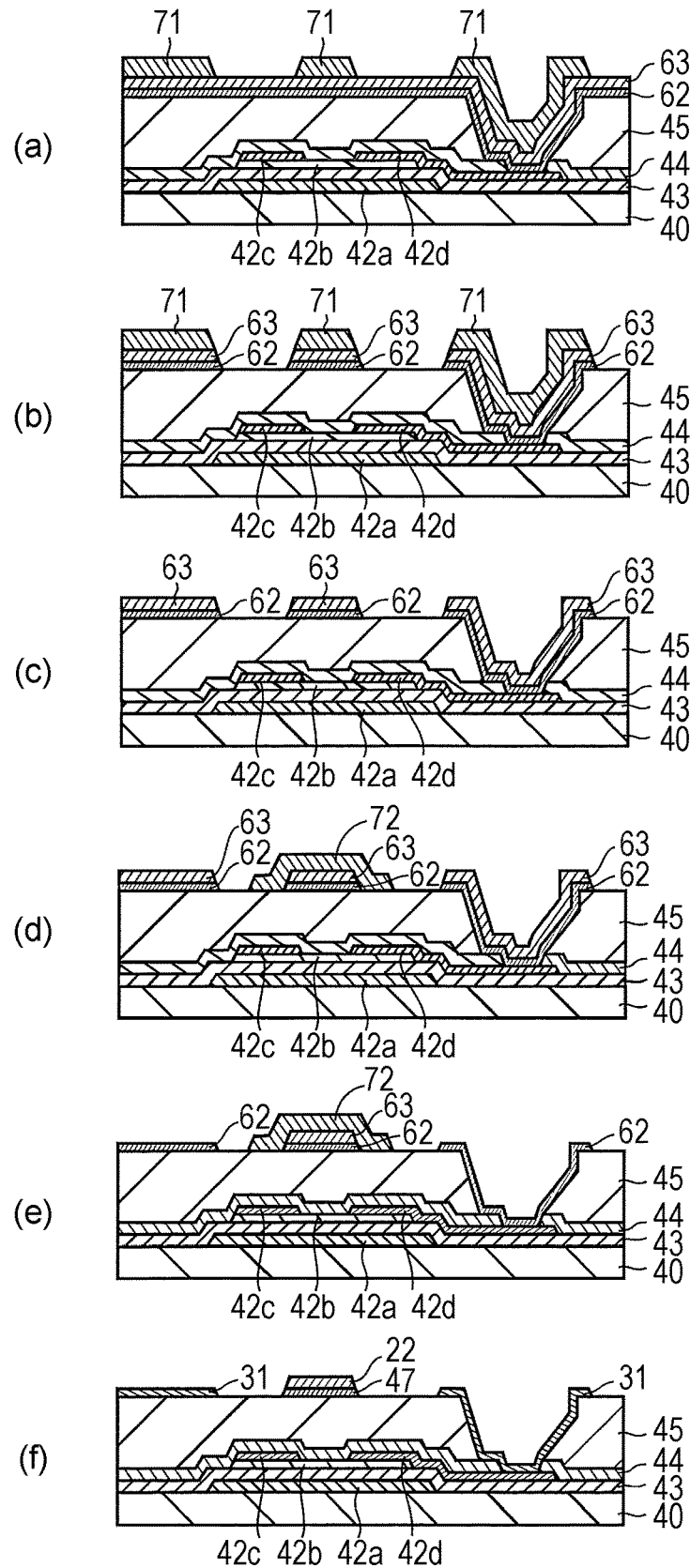
FIG. 7 is a diagram for explaining a manufacturing process of the touch panel-attached display device in the first embodiment which follows the manufacturing process shown in FIG. 6.
Figure 8:
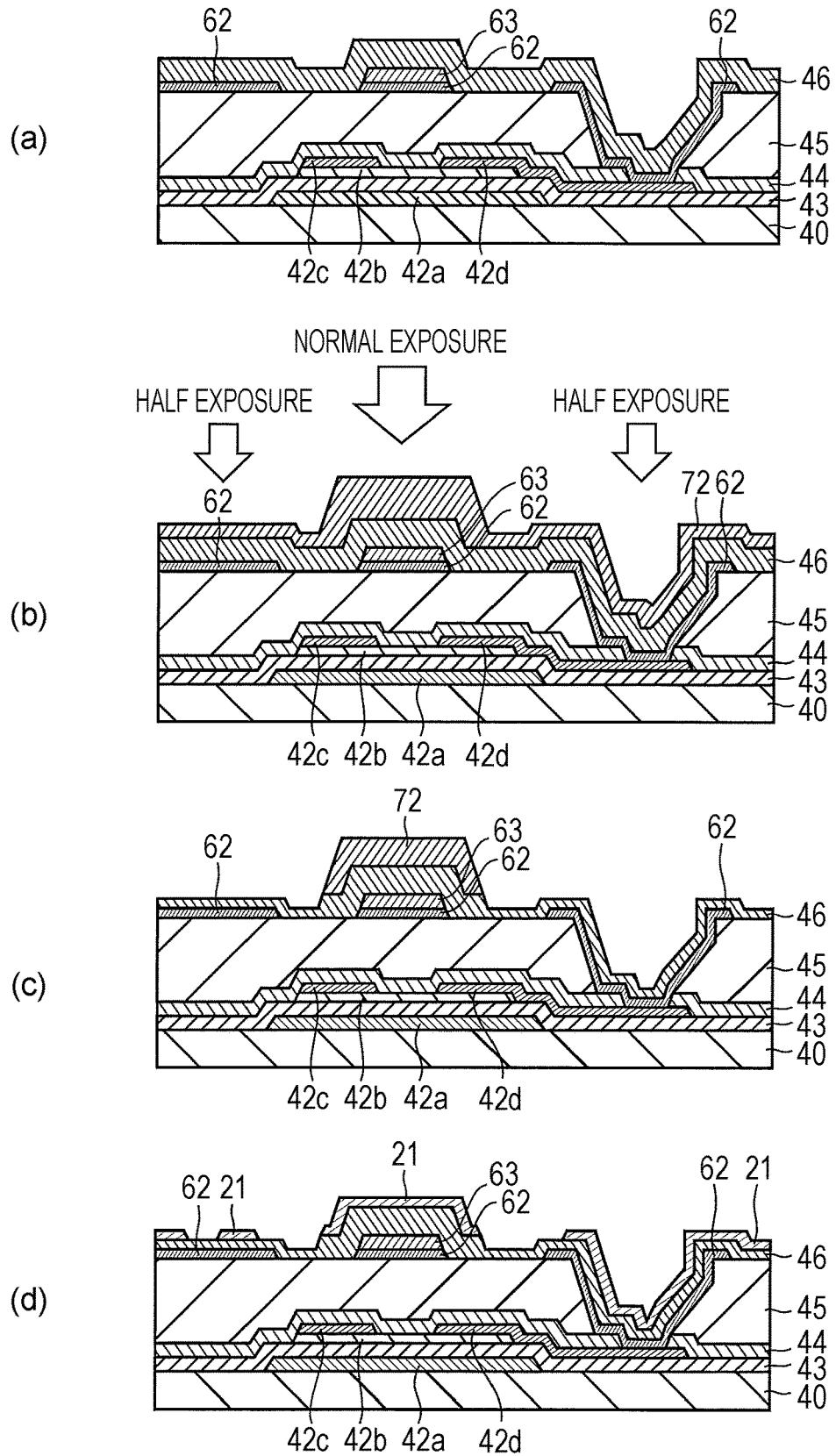
FIG. 8 is a diagram for explaining a manufacturing process of the touch panel-attached display device in the first embodiment which follows the manufacturing process shown in FIG. 7.

FIG. 6 to FIG. 8 are diagrams for explaining a manufacturing process of the touch panel-attached display device 10 according to the first embodiment.

The TFT 42 is formed on the glass substrate 40 by a known method. FIG. 6(a) shows a state in which the TFT 42 is formed on the glass substrate 40 by a known method and the first insulating film 44 and the planarizing film 45 are formed thereon. A hole is formed in the planarizing film 45 to form the contact hole CH1 which connects the pixel electrode 31 and the drain electrode 42d of the TFT 42.

From the state shown in FIG. 6(a), a plasma treatment using nitrogen gas or oxygen gas is performed on the exposed surface (refer to FIG. 6(b)). That is, plasma treatment is performed on the exposed surfaces of the first insulating film 44 and the planarizing film 45. Performing the plasma treatment makes it possible to form fine irregularities on the smooth surface (surface roughening) and to improve the adhesion at the time of forming the transparent electrode film in the subsequent step.

Next, a mask 61 is formed on the surface of the planarizing film 45 using a photoresist (refer to FIG. 6(c)). Then, the first insulating film 44 not covered with the mask 61 is dry-etched to form the contact hole CH1 (refer to FIG. 6(d)). Thereafter, the mask 61 is peeled off (refer to FIG. 6(e)).

Subsequently, a transparent electrode film 62 for forming the pixel electrode 31 and the conductive film 47 is formed, and a metal film 63 for forming the touch sensor wiring 22 is formed thereon (refer to FIG. 6(f)). The thickness of the transparent electrode film 62 is, for example, 10 nm to 150 nm. In addition, the thickness of the metal film 63 is, for example, 50 nm to 300 nm.

Subsequently, a mask 71 is formed on the metal film 63 using a photoresist (refer to FIG. 7(a)). The mask 71 is formed in a region for forming the pixel electrode 31 and a region for forming the touch sensor wiring 22. Subsequently, the transparent electrode film 62 and the metal film 63 in a region not covered with the mask 71 are wet-etched (refer to FIG. 7(b)).

Then, the mask 71 is peeled off (refer to FIG. 7(c)).

Next, a mask 72 is formed using a photoresist on the metal film 63 which is the touch sensor wiring 22 in the region where the metal film 63 is formed (refer to FIG. 7(d)). Then, the metal film 63 not covered with the mask 72 is removed by wet etching (refer to FIG. 7(e)). Thereafter, the mask 72 is peeled off (refer to FIG. 7(f)). Due to this, the pixel electrode 31, the conductive film 47, and touch sensor wiring 22 are formed.

Subsequently, the second insulating film 46 is formed (refer to FIG. 8(a)). The thickness of the second insulating film 46 is, for example, 200 to 400 nm.

Subsequently, after forming a photoresist film on the surface of the second insulating film 46, the portion in which the touch sensor wiring 22 is formed is exposed normally and the portion in which the pixel electrode 31 is formed is exposed with a half exposure. Thereafter, an ashing treatment is performed in order to set the film thickness of the photoresist film to a desired thickness. Due to this, the mask 72 is formed in which the film thickness of the portion in which the touch sensor wiring 22 is formed is thick, and the film thickness of the portion in which the pixel electrode 31 is formed is thin (refer to FIG. 8(*b*)).

Subsequently, dry etching is performed. As the etching gas, it is possible to use, for example, $SF_6$ gas or $CF_4$ gas. Since the mask 72 in the portion in which the touch sensor wiring 22 is formed is thick, the second insulating film 46 in this portion remains as it is without being etched. On the other hand, since the mask 72 is thin in the portion in which the pixel electrode 31 is formed, only part of the thickness of the second insulating film 46 is removed in this portion (refer to FIG. 8(*c*)). That is, in the portion in which the pixel electrode 31 is formed, half-etching is performed, in which a part of the thickness of the second insulating film 46 is removed. In the half-etching, for example, half the thickness of the second insulating film 46 being formed is removed.

After peeling off the mask 72, a transparent electrode film for forming the counter electrode 21 is formed (refer to FIG. 8(*d*)).

FIG. 6 to FIG. 8 illustrate the manufacturing process of the portion in which the counter electrode 21 and the touch sensor wiring 22 are not in contact with each other, but the manufacturing process of the portion in which the counter electrode 21 and the touch sensor wiring 22 are in contact is the same. A description will be given of the manufacturing process performed after FIG. 7(*f*) in the manufacturing processes of the portion in which the counter electrode 21 and the touch sensor wiring 22 are in contact with each other with reference to FIG. 9.

Figure 9:
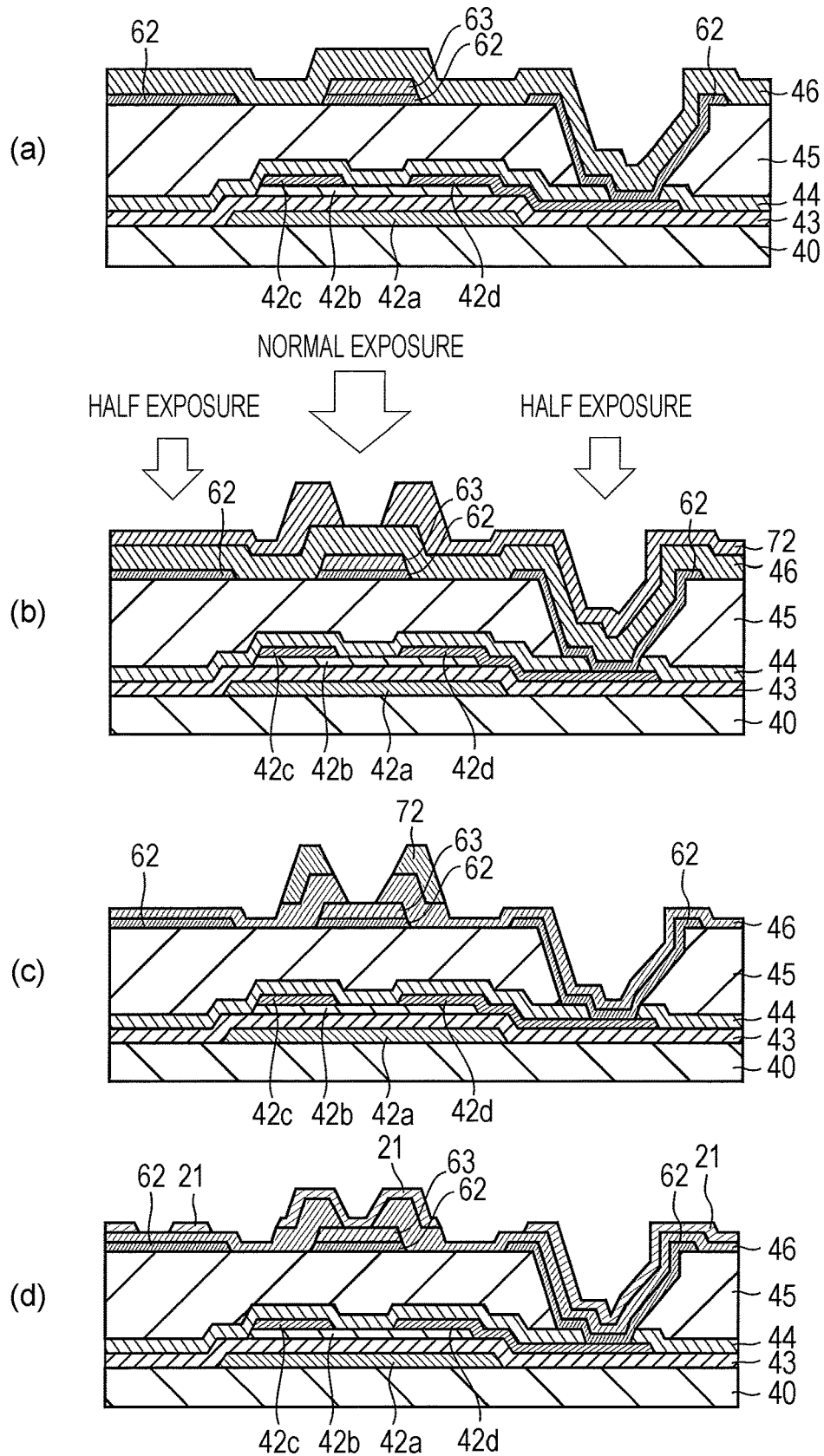
FIG. 9 is a diagram for explaining a manufacturing process performed after FIG. 7(f) in manufacturing processes of the portion in which the counter electrode and the touch sensor wiring are in contact.

After the step of FIG. 7(*f*), the second insulating film 46 is formed (refer to FIG. 9(*a*)).

Subsequently, a photoresist film is formed on the surface of the second insulating film 46, the portion in which the touch sensor wiring 22 is formed is exposed normally, the portion in which the pixel electrode 31 is formed is exposed with a half exposure, and then an ashing treatment is performed in order to set the thickness of the photoresist film to a desired thickness. Due to this, the mask 72 is formed in which the portion in which the touch sensor wiring 22 is formed is thick, and the portion in which the pixel electrode 31 is formed is thin. However, in the portion in which the touch sensor wiring 22 is formed, the mask 72 is formed by carrying out exposure such that the mask 72 is not formed in a region for connecting the touch sensor wiring 22 and the counter electrode 21 to be formed in a later process (refer to FIG. 9(*b*)).

Subsequently, dry etching is performed. Since the mask 72 in the portion in which the touch sensor wiring 22 is formed is thick, the second insulating film 46 in this portion remains as it is without being etched. On the other hand, since the mask 72 in the portion in which the pixel electrode 31 is formed is thin, only part of the thickness of the second insulating film 46 in this portion is removed (half-etching). In addition, the second insulating film 46 in the region above the touch sensor wiring 22 where the mask 72 is not formed is entirely removed by etching (refer to FIG. 9(*c*)).

After peeling off the mask 72, a transparent electrode film for forming the counter electrode 21 is formed (refer to FIG. 9(*d*)). Due to this, the touch sensor wiring 22 and the counter electrode 21 are electrically connected.

[Second Embodiment]

Figure 10:
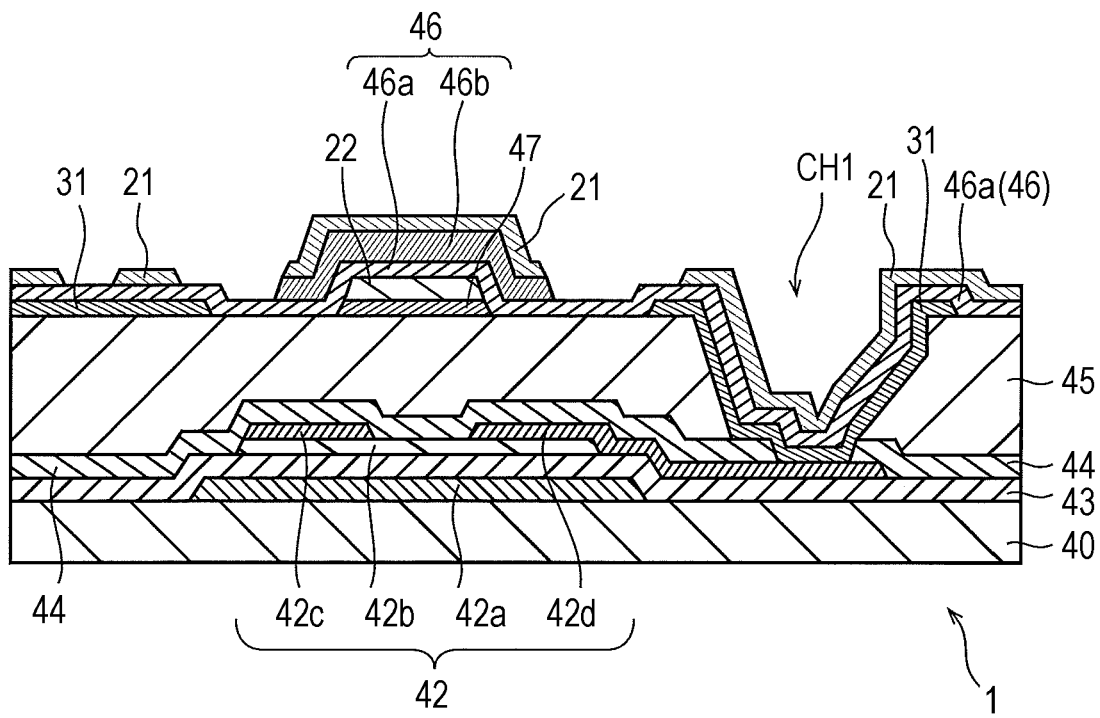
FIG. 10 is a cross-sectional diagram of an active matrix substrate in a second embodiment at a position including a TFT, in a portion in which a counter electrode and a touch sensor wiring are not in contact.
Figure 11:
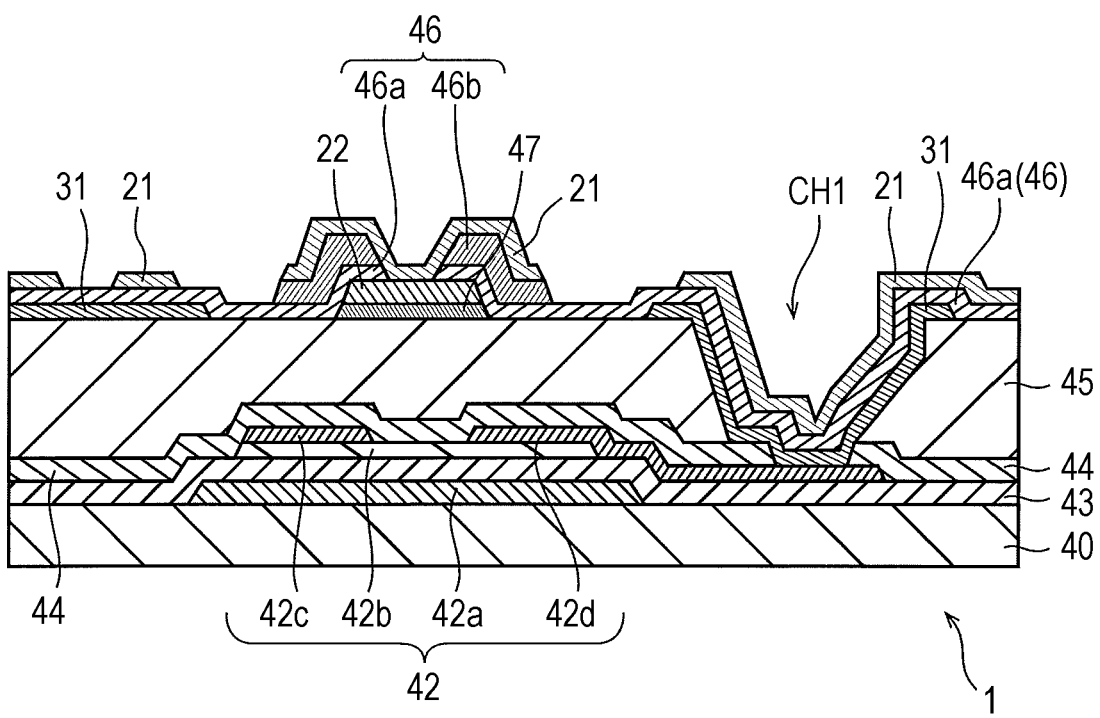
FIG. 11 is a cross-sectional diagram of the active matrix substrate in the second embodiment at a position including the TFT, in a portion in which the counter electrode and the touch sensor wiring are in contact.

FIG. 10 and FIG. 11 are cross-sectional diagrams of the active matrix substrate 1 at the position including the TFT 42 in the second embodiment. FIG. 10 is a cross-sectional diagram of a portion in which the counter electrode 21 and the touch sensor wiring 22 are not in contact. FIG. 11 is a cross-sectional diagram of a portion in which the counter electrode 21 and the touch sensor wiring 22 are in contact.

In the present embodiment as well, in the same manner as the first embodiment, the thickness of the second insulating film 46 between the touch sensor wiring 22 and the counter electrode 21 is thicker than the thickness of the second insulating film 46 between the pixel electrode 31 and the counter electrode 21. However, the second insulating film 46 between the touch sensor wiring 22 and the counter electrode 21 is formed of two insulating film layers of an insulating film 46*a* formed of a first material and an insulating film 46*b* formed of a second material. In addition, the second insulating film 46 between the pixel electrode 31 and the counter electrode 21 is formed of one insulating film layer which is the insulating film 46*a* formed of a first material.

The second material is a material having a higher etching rate than the first material. For example, the second material is SiNx (silicon nitride) and the first material is $SiO_2$ (silicon dioxide). The film thickness of the insulating film 46*b* in a case where SiNx is used as the second material is, for example, 50 nm to 500 nm. In addition, the film thickness of the insulating film 46*a* in a case where SiO2 is used as the first material is, for example, 50 to 200 nm. However, the second material is not limited to SiNx and the first material is not limited to $SiO_2$.

Figure 12:
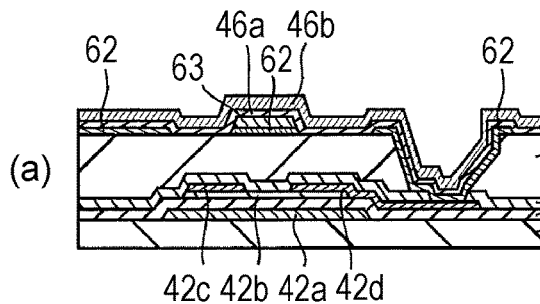
FIG. 12 is a diagram for explaining a manufacturing process performed after FIG. 7(f) in the manufacturing processes of the touch panel-attached display device according to the second embodiment.
Figure 12:
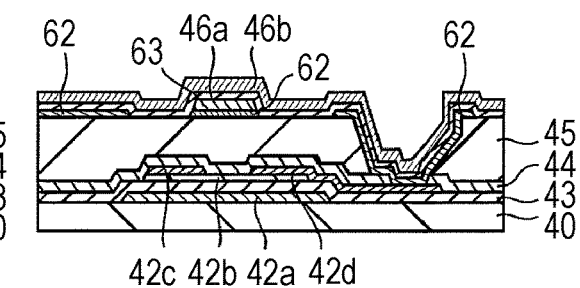
Figure 12:
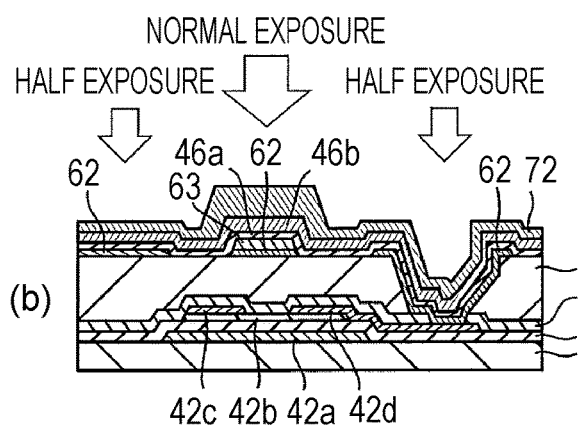
Figure 12:
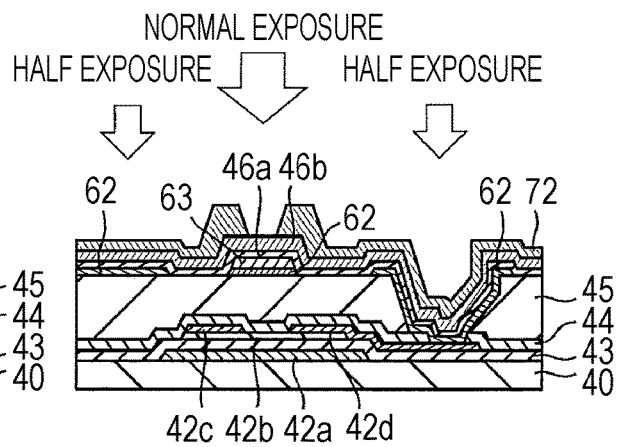
Figure 12:
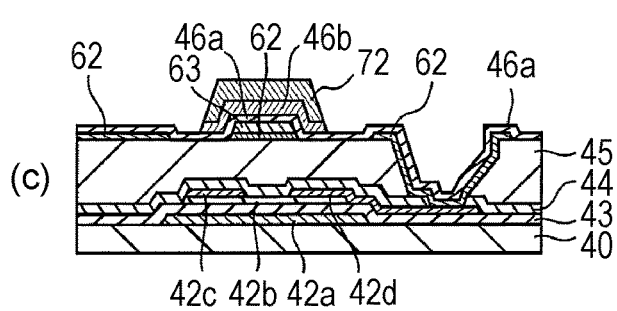
Figure 12:
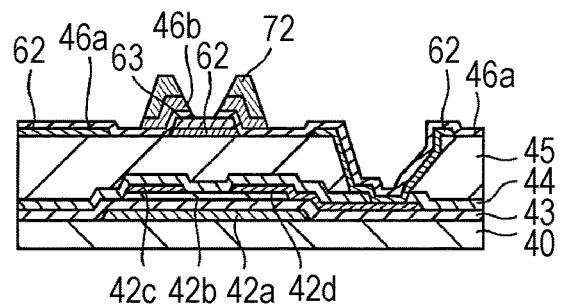
Figure 12:
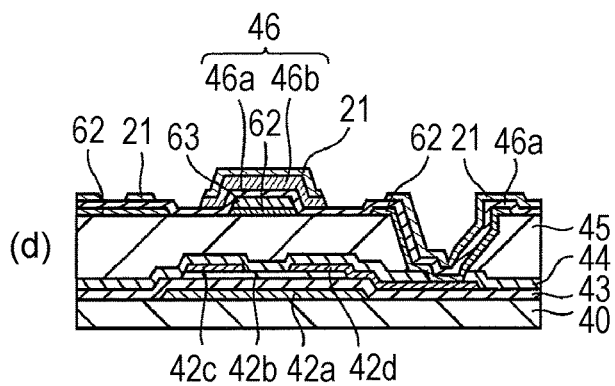
Figure 12:
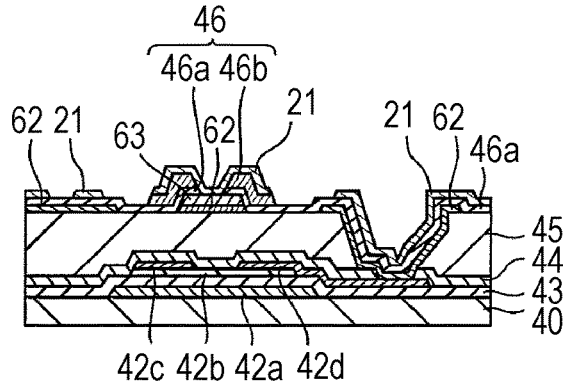

In the manufacturing processes of the touch panel-attached display device 10 in the second embodiment, the manufacturing processes from FIG. 6(*a*) to FIG. 7(*f*) are the same as those in the first embodiment. Accordingly, a description will be given of the manufacturing process performed after FIG. 7(*f*) with reference to FIG. 12. In FIG. 12, the left side is a cross-sectional diagram for explaining the manufacturing process of the portion in which the counter electrode 21 and the touch sensor wiring 22 are not in contact, and the right side is a cross-sectional diagram for explaining the manufacturing process of the portion in which the counter electrode 21 and the touch sensor wiring 22 are in contact.

When the process shown in FIG. 7(*f*) is finished, the insulating film 46*a* formed of a first material is formed so as to cover the pixel electrode 31 and the touch sensor wiring 22, and the insulating film 46*b* formed of a second material is formed thereon (refer to FIG. 12(*a*)).

Subsequently, after a photoresist film is formed on the surface of the insulating film 46*b* formed of the second material, a portion in which the touch sensor wiring 22 is formed is exposed normally and a portion in which the pixel electrode 31 is formed is exposed with a half exposure. Thereafter, an ashing treatment is performed in order to set the film thickness of the photoresist film to a desired thickness. Due to this, the mask 72 is formed in which the film thickness of the portion in which the touch sensor wiring 22 is formed is thick, and the film thickness of the portion in which the pixel electrode 31 is formed is thin (refer to FIG. 12(*b*)). In a portion in which the touch sensor wiring 22 and the counter electrode 21 are in contact, exposure is carried out such that the mask 72 is not formed in a region for connecting the touch sensor wiring 22 and the counter electrode 21 to be formed in a later process in the portion in which the touch sensor wiring 22 is formed (refer to the cross-sectional diagram on the right side of FIG. 12(*b*)).

Subsequently, dry etching is performed. As the etching gas, it is possible to use SF$_6$ gas or CF$_4$ gas, for example. Since the mask 72 in the portion in which the touch sensor wiring 22 is formed is thick, the second insulating film 46 in this portion remains as it is without being etched. On the other hand, since the mask 72 in the portion in which the pixel electrode 31 is formed is thin, only the upper layer of the insulating film 46b formed of the second material is removed in this portion (refer to FIG. 12(c)). That is, in the portion in which the pixel electrode 31 is formed, half-etching is performed in which only the insulating film 46b formed of the second material is removed out of the insulating film 46a formed of the first material and the insulating film 46b formed of the second material.

In addition, in the region above the touch sensor wiring 22 where the mask 72 is not formed, the insulating film 46b formed of the second material and the insulating film 46a formed of the first material are removed by etching (refer to the cross-sectional diagram on the right side of FIG. 12(c)).

In the present embodiment, the second insulating film 46 has a two-layer structure of the insulating film 46a formed of a first material and the insulating film 46b formed of a second material and the insulating film 46b formed of a second material having a high etching rate compared to the insulating film 46a formed of a first material is formed on the upper layer (the liquid crystal layer 3 side). Due to this, it is possible to easily remove only the insulating film 46b formed of the second material having a high etching rate by half-etching.

After peeling off the mask 72, a transparent electrode film for forming the counter electrode 21 is formed (refer to FIG. 12(d)).

[Third Embodiment]

Figure 13:
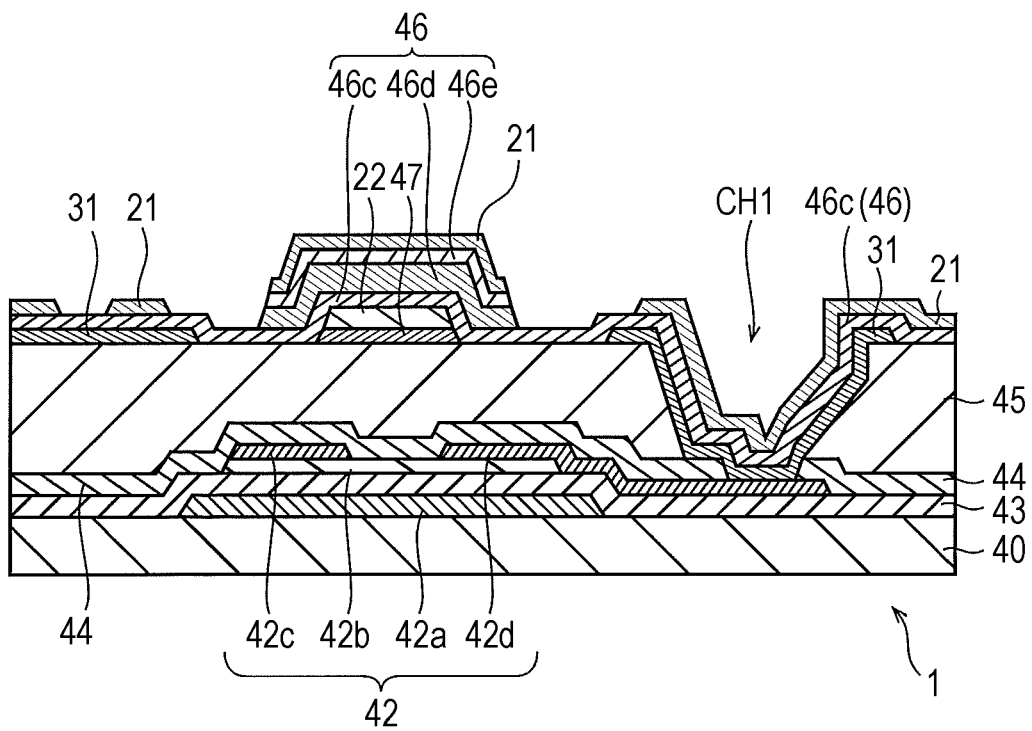
FIG. 13 is a cross-sectional diagram of an active matrix substrate in a third embodiment at a position including the TFT, in a portion in which a counter electrode and a touch sensor wiring are not in contact.
Figure 14:
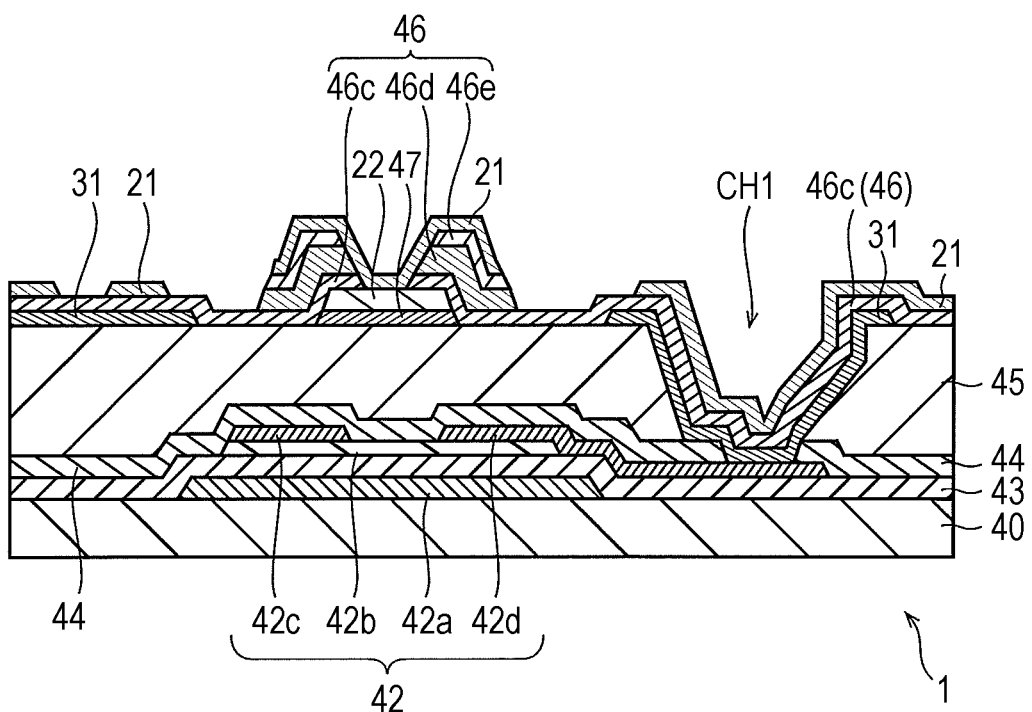
FIG. 14 is a cross-sectional diagram of the active matrix substrate in the third embodiment at a position including the TFT, in a portion in which the counter electrode and the touch sensor wiring are in contact.

FIG. 13 and FIG. 14 are cross-sectional diagrams of the active matrix substrate 1 at the position including the TFT 42 in the third embodiment. FIG. 13 is a cross-sectional diagram of a portion in which the counter electrode 21 and the touch sensor wiring 22 are not in contact. FIG. 14 is a cross-sectional diagram of a portion in which the counter electrode 21 and the touch sensor wiring 22 are in contact.

In the present embodiment as well, in the same manner as the first and second embodiments, the thickness of the second insulating film 46 between the touch sensor wiring 22 and the counter electrode 21 is thicker than the thickness of the second insulating film 46 between the pixel electrode 31 and the counter electrode 21. However, the second insulating film 46 between the touch sensor wiring 22 and the counter electrode 21 is formed of three insulating film layers, which are an insulating film 46c formed of a first material, an insulating film 46d formed of a second material, and an insulating film 46e formed of a third material. In addition, the second insulating film 46 between the pixel electrode 31 and the counter electrode 21 is formed of one insulating film layer, which is the insulating film 46c formed of the first material.

In the same manner as the second embodiment, the second material is a material having a higher etching rate than the first material. For example, the second material is SiNx and the first material is SiO$_2$. In addition, the third material is, for example, SiO$_2$. The film thickness of the insulating film 46c in a case where SiO$_2$ is used as the first material is, for example, 50 to 200 nm. The film thickness of the insulating film 46d in a case where SiNx is used as the second material is, for example, 50 nm to 500 nm. The film thickness of the insulating film 46e in a case where SiO$_2$ is used as the third material is, for example, 50 to 200 nm. However, the first material is not limited to SiO$_2$, and the second material is not limited to SiNx. In addition, the third material is not limited to SiO$_2$.

Figure 15:
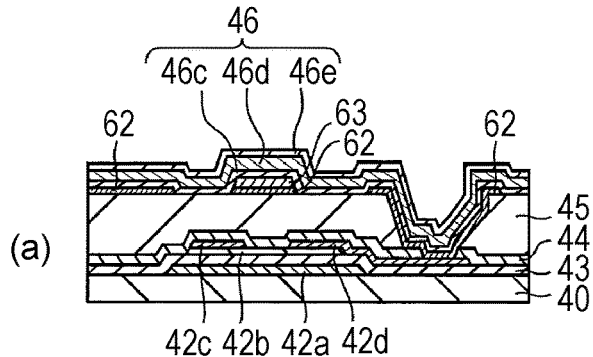
FIG. 15 is a diagram for explaining a manufacturing process performed after FIG. 7(f) in the manufacturing processes of the touch panel-attached display device in the third embodiment.
Figure 15:
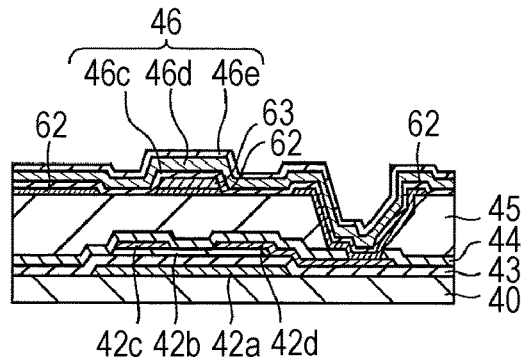
Figure 15:
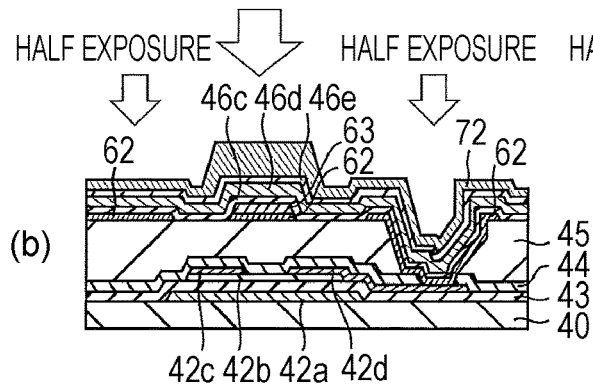
Figure 15:
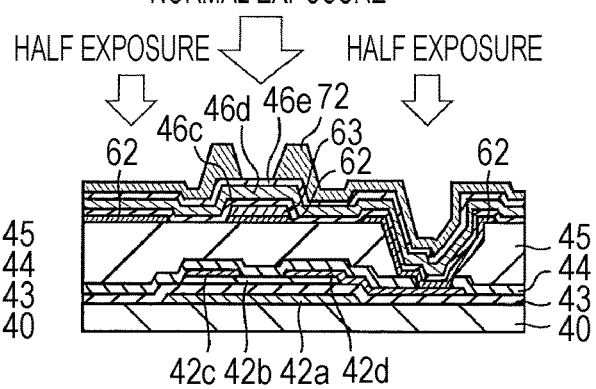
Figure 15:
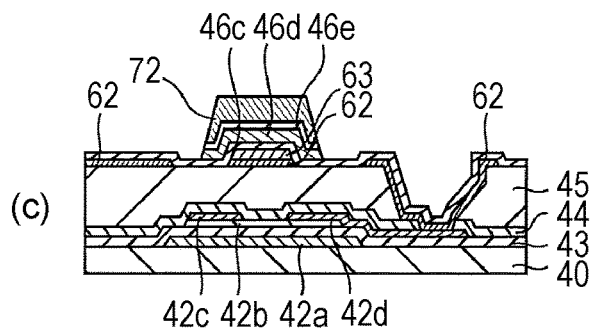
Figure 15:
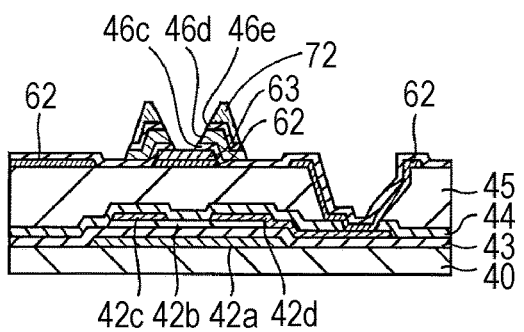
Figure 15:
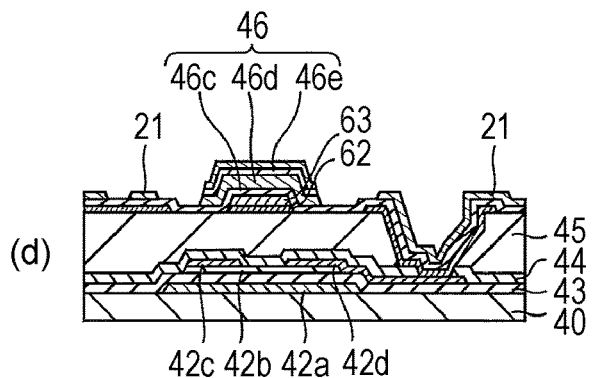
Figure 15:
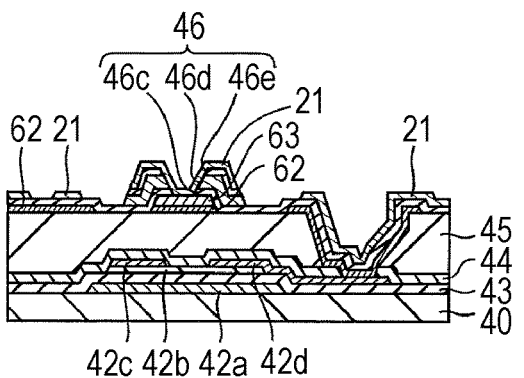

In the manufacturing processes of the touch panel-attached display device 10 according to the third embodiment, the manufacturing processes from FIG. 6(a) to FIG. 7(f) are the same as those in the first embodiment. Accordingly, a description will be given of the manufacturing process performed after FIG. 7(f) with reference to FIG. 15. In FIG. 15, the left side is a cross-sectional diagram for explaining the manufacturing process of the portion in which the counter electrode 21 and the touch sensor wiring 22 are not in contact, and the right side is a cross-sectional diagram for explaining the manufacturing process of the portion in which the counter electrode 21 and the touch sensor wiring 22 are in contact.

When the process shown in FIG. 7(f) is finished, the insulating film 46c formed of a first material is formed so as to cover the pixel electrode 31 and the touch sensor wiring 22. Subsequently, the insulating film 46d formed of a second material is formed on the insulating film 46c, and the insulating film 46e formed of a third material is formed on the insulating film 46d (refer to FIG. 15(a)).

Subsequently, after a photoresist film is formed on the surface of the insulating film 46e formed of the third material, a portion in which the touch sensor wiring 22 is formed is exposed normally and a portion in which the pixel electrode 31 is formed is exposed with a half exposure. Thereafter, an ashing treatment is performed in order to set the film thickness of the photoresist film to a desired thickness. Due to this, the mask 72 is formed in which the film thickness of the portion in which the touch sensor wiring 22 is formed is thick, and the film thickness of the portion in which the pixel electrode 31 is formed is thin (refer to FIG. 15(b)). In a portion in which the touch sensor wiring 22 and the counter electrode 21 are in contact, exposure is carried out such that the mask 72 is not formed in a region for connecting the touch sensor wiring 22 and the counter electrode 21 to be formed in a later process in the portion in which the touch sensor wiring 22 is formed (refer to the cross-sectional diagram on the right side of FIG. 15(b)).

Subsequently, dry etching is performed. As the etching gas, it is possible to use SF$_6$ gas or CF$_4$ gas, for example. Since the mask 72 in the portion in which the touch sensor wiring 22 is formed is thick, the second insulating film 46 in this portion remains as it is without being etched. On the other hand, since the mask 72 in the portion in which the pixel electrode 31 is formed is thin, the insulating film 46d formed of the second material and the insulating film 46e formed of the third material are removed in this portion (refer to FIG. 15(c)). That is, in the portion in which the pixel electrode 31 is formed, half-etching is performed in which only the insulating film 46d formed of the second material and the insulating film 46e formed of the third material are removed from among the insulating film 46c formed of the first material, the insulating film 46d formed of the second material, and the insulating film 46e formed of the third material.

In addition, in the region above the touch sensor wiring 22 where the mask 72 is not formed, the insulating film 46c formed of the first material, the insulating film 46d formed of the second material, and the insulating film 46e formed of the third material are removed by etching (refer to the cross-sectional diagram on the right side of FIG. 15(c)).

In the present embodiment, the second insulating film 46 has a three-layer structure of the insulating film 46c formed of a first material, the insulating film 46d formed of a second material, and the insulating film 46e formed of a third material, and the insulating film 46d formed of a second material having a high etching rate is formed on the insulating film 46c formed of the first material which is the lowermost layer. Due to this, leaving only the insulating film 46a formed of the first material which is the lowermost layer by half-etching makes it possible to easily remove only the insulating film 46d formed of the second material and the insulating film 46e formed of the third material, which have a high etching rate.

Subsequently, after peeling off the mask 72, a transparent electrode film for forming the counter electrode 21 is formed (refer to FIG. 15(d)).

According to the present embodiment, since the second insulating film 46 between the touch sensor wiring 22 and the counter electrode 21 has a three-layer structure of the insulating film 46c formed of the first material, the insulating film 46d formed of the second material, and the insulating film 46e formed of the third material, it is possible to further reduce parasitic capacitance between the touch sensor wiring and the counter electrode 21, compared to the first and second embodiments. Due to this, it is possible to further improve the sensing sensitivity of the touch panel.

It is possible for the touch panel-attached display device 10 according to the present embodiment to have various modified configurations.

[Modification 1]

Figure 16:
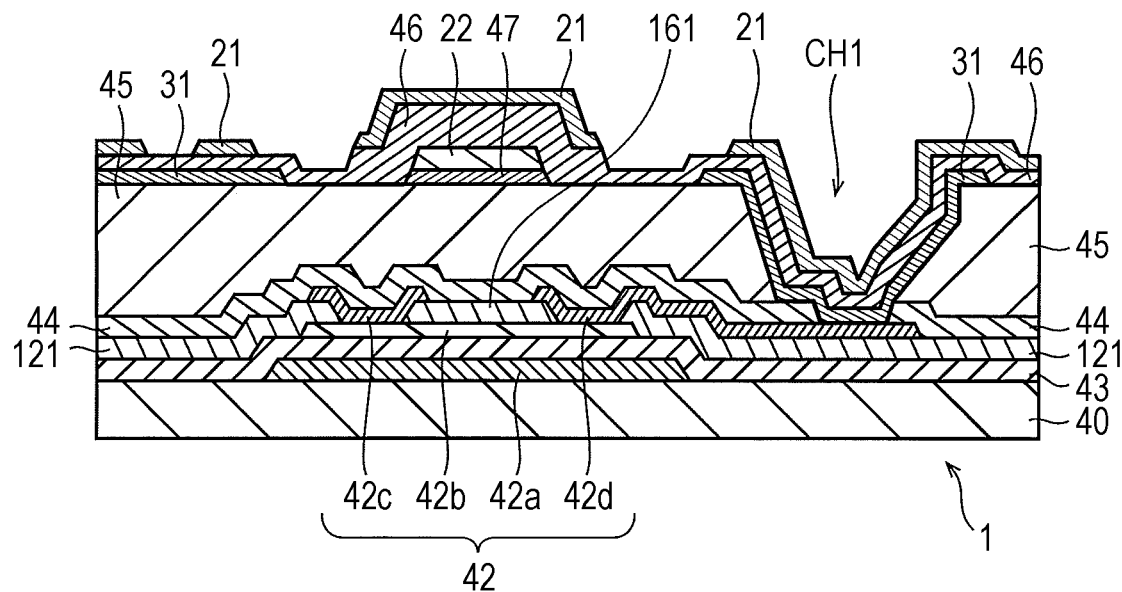
FIG. 16 is a cross-sectional diagram of an active matrix substrate at a position including a TFT in a touch panel-attached display device in a configuration of modification 1.

FIG. 16 is a cross-sectional diagram of the active matrix substrate 1 at a position including a TFT in a touch panel-attached display device 10A in the configuration of modification 1. In the configuration of modification 1, an etch stopper layer 161 is provided on the semiconductor film 42b of the TFT 42 and between the source electrode 42c and the drain electrode 42d. Providing the etch stopper layer 161 makes it possible to prevent the semiconductor film 42b from being damaged by etching during the formation of the source electrode 42c and the drain electrode 42d.

[Modification 2]

Figure 17:
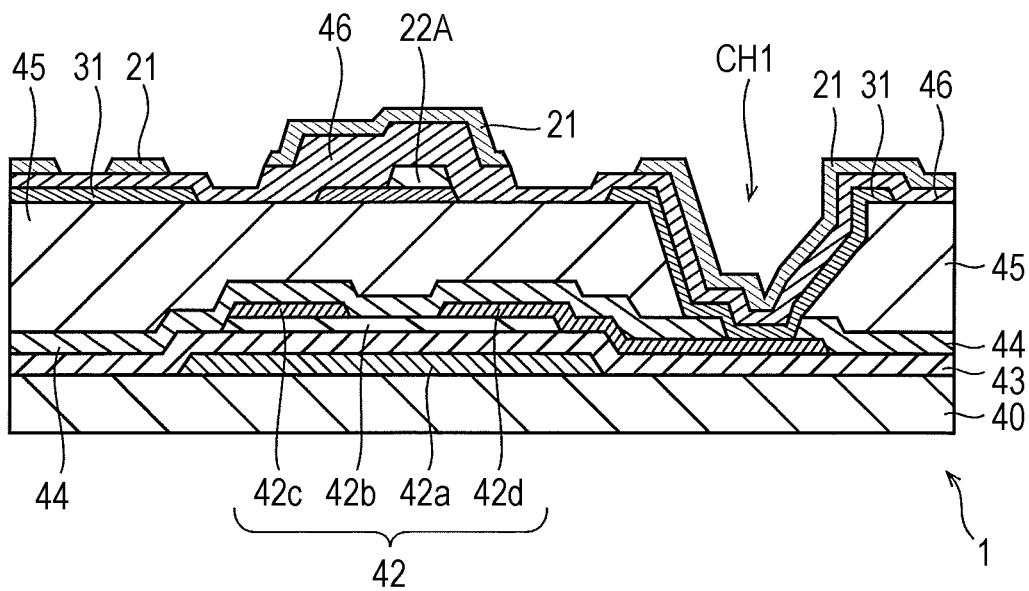
FIG. 17 is a cross-sectional diagram of an active matrix substrate in a configuration of modification 2 at a position including a TFT in a portion in which a counter electrode and a touch sensor wiring are not in contact.
Figure 18:
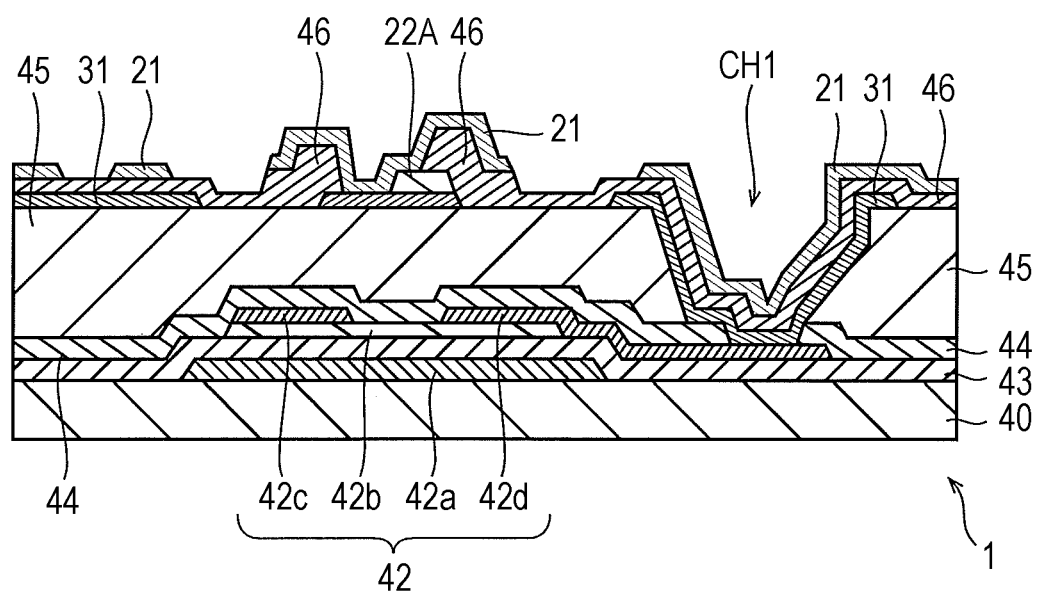
FIG. 18 is a cross-sectional diagram of an active matrix substrate in the configuration of modification 2 at a position including a TFT in a portion in which the counter electrode and the touch sensor wiring are in contact.

FIG. 17 and FIG. 18 are cross-sectional diagrams of the active matrix substrate 1 at the position including the TFT in a touch panel-attached display device 10B in the configuration of modification 2. FIG. 17 is a cross-sectional diagram of a portion in which the counter electrode 21 and the touch sensor wiring 22 are not in contact. FIG. 18 is a cross-sectional diagram of a portion in which the counter electrode 21 and the touch sensor wiring 22 are in contact. In the configuration of modification 2, as shown in FIG. 17 and FIG. 18, the line width of the touch sensor wiring 22 is narrower than the line width of the touch sensor wiring 22 shown in FIG. 4 and FIG. 5.

Specifically, in the configuration shown in FIG. 5, the touch sensor wiring 22 is in contact with the second insulating film 46 on both sides of a region in contact with the counter electrode 21 on the upper surface (the surface on the counter electrode 21 side) of the touch sensor wiring 22. On the other hand, in the configuration shown in FIG. 18, a touch sensor wiring 22A is in contact with the second insulating film 46 only on one side of the region of the upper surface of the touch sensor wiring 22A in contact with the counter electrode 21.

For example, as shown in FIG. 18, in a case where the adhesion between the touch sensor wiring 22A and the second insulating film 46 is poor, having a configuration in which the touch sensor wiring 22A is in contact with the second insulating film 46 only on one side rather than both sides reduces the surface area of the interface between the touch sensor wiring 22A and the second insulating film 46, thus improving the adhesion.

The embodiments described above are merely examples for implementing the present invention, thus, the present invention is not limited to the embodiments described above, and it is possible to appropriately modify and implement the embodiments described above without departing from the spirit of the invention.

For example, the TFT 42 is not limited to being a bottom gate type and may be a top gate type. In addition, the semiconductor film 42b may be an oxide semiconductor film such as indium tin zinc oxide (ITZO), or may be a film formed of a semiconductor material such as amorphous silicon, low temperature poly silicon (LTPS), or continuous grain silicon (CGS).

The second insulating film 46 between the touch sensor wiring 22 and the counter electrode 21 may be formed of four or more insulating film layers.

In the manufacturing processes shown in FIG. 6 to FIG. 8, after the TFT 42 is formed on the glass substrate 40 and the first insulating film 44 and the planarizing film 45 are formed on the TFT 42 (refer to FIG. 6(a)), a plasma treatment was performed (refer to FIG. 6(b)) before arranging the mask 61 (refer to FIG. 6(c)). However, the plasma treatment is not limited to this timing, and the plasma treatment may be performed after peeling off the mask 61 (refer to FIG. 6(e)) before the transparent electrode film 62 and the metal film 63 are formed (refer to FIG. 6(f)).

REFERENCE SIGNS LIST

1 ACTIVE MATRIX SUBSTRATE
2 COUNTER SUBSTRATE
3 LIQUID CRYSTAL LAYER
10, 10A, 10B TOUCH PANEL-ATTACHED DISPLAY DEVICE
21 COUNTER ELECTRODE
22, 22A TOUCH SENSOR WIRING
31 PIXEL ELECTRODE
42 TFT (DISPLAY CONTROL ELEMENT)
42a GATE ELECTRODE
42b SEMICONDUCTOR FILM
42c SOURCE ELECTRODE
42d DRAIN ELECTRODE
43 GATE INSULATING FILM
44 FIRST INSULATING FILM
45 PLANARIZING FILM
46 SECOND INSULATING FILM
46a, 46c INSULATING FILM FORMED OF FIRST MATERIAL
46b, 46d INSULATING FILM FORMED OF SECOND MATERIAL
46e INSULATING FILM FORMED OF THIRD MATERIAL
47 CONDUCTIVE FILM

The invention claimed is:

1. A touch panel-attached display device comprising:
an active matrix substrate;
a counter substrate opposing the active matrix substrate;
a liquid crystal layer interposed between the active matrix substrate and the counter substrate;
a display control element formed on the active matrix substrate;
a first insulating film formed on the active matrix substrate further to the liquid crystal layer side than the display control element;

a plurality of pixel electrodes formed on the active matrix substrate further to the liquid crystal layer side than the first insulating film;

a second insulating film formed on the active matrix substrate further to the liquid crystal layer side than the plurality of pixel electrodes;

a plurality of counter electrodes formed on the active matrix substrate further to the liquid crystal layer side than the second insulating film and forming an electrostatic capacitance between each of the counter electrodes and each of the pixel electrodes;

a control unit which is provided on the active matrix substrate and which detects a touch position by supplying a touch driving signal to the plurality of counter electrodes; and a touch sensor wiring formed between the first insulating film and the second insulating film, which connects the control unit and the counter electrode, and which is for supplying the touch driving signal from the control unit to the counter electrode, wherein, a thickness of a first portion of the second insulating film formed between the counter electrode and the touch sensor wiring is thicker than that of a second portion of the second insulating film formed between the pixel electrode and the counter electrode.

2. The touch panel-attached display device according to claim 1, wherein the first portion is formed of two insulating film layers, and the second portion is formed of one insulating film layer.

3. The touch panel-attached display device according to claim 2, wherein the two insulating film layers include an insulating film formed of a first material and an insulating film formed of a second material having a higher etching rate than that of the first material, and the insulating film formed of the second material is formed on the liquid crystal layer side with respect to the insulating film formed of the first material.

4. The touch panel-attached display device according to claim 3, wherein the first material is silicon nitride and the second material is silicon oxide.

5. The touch panel-attached display device according to claim 1, wherein the first portion is formed of three or more insulating film layers, and the second portion is formed of one insulating film layer.

6. The touch panel-attached display device according to claims 1, further comprising:

a conductive film which is provided between the touch sensor wiring and the first insulating film and is formed of an identical material as the pixel electrode.

7. The touch panel-attached display device according to claims 1, further comprising:

a planarizing film formed between the first insulating film and the pixel electrode.

8. The touch panel-attached display device according to claims 1, further comprising:

wherein by making the thickness of the first portion thicker than the thickness of the second portion, parasitic capacitance between the touch sensor wiring and the counter electrode is reduced, compared with a provisional case where the thickness of the first portion is the same as the thickness of the second portion.

9. A method for manufacturing a touch panel-attached display device which is provided with an active matrix substrate, a counter substrate opposing the active matrix substrate, and a liquid crystal layer interposed between the active matrix substrate and the counter substrate, and which has a touch position detection function, the method comprising:

a step of forming a display control element on the active matrix substrate;

a step of forming a first insulating film so as to cover the display control element after forming the display control element;

a step of forming a planarizing film so as to cover the first insulating film after forming the first insulating film;

a step of forming a pixel electrode after forming the planarizing film;

a step of forming a touch sensor wiring for supplying a touch driving signal after forming the planarizing film;

a step of forming a second insulating film after forming the pixel electrode and the touch sensor wiring; and a step of forming a counter electrode to be electrically connected to the touch sensor wiring after forming the second insulating film, wherein, in the step of forming the second insulating film, the second insulating film is formed to have a thickness of a second portion of the second insulating film between the pixel electrode and the counter electrode which is thinner than a thickness of a first portion of the second insulating film between the counter electrode and the touch sensor wiring.

10. The method for manufacturing a touch panel-attached display device according to claim 9, wherein, in the step of forming the second insulating film, the second insulating film having a predetermined thickness is formed between the pixel electrode and the counter electrode and between the counter electrode and the touch sensor wiring, and then half-etching of the second insulating film is performed such that the thickness of the second portion of the second insulating film between the pixel electrode and the counter electrode becomes thinner.

11. The method for manufacturing a touch panel-attached display device according to claim 9, wherein, in the step of forming a second insulating film, the first layer second insulating film is formed on the pixel electrode and the touch sensor wiring, a second layer second insulating film is formed on the first layer second insulating film, and then the second layer second insulating film in the second portion is removed by etching.

12. The method for manufacturing a touch panel-attached display device according to claim 11, wherein the second layer second insulating film is formed of a material having a higher etching rate than that of the first layer second insulating film, and in the step of forming a second insulating film, the first layer second insulating film and the second layer second insulating film are formed and then the second layer second insulating film in the second portion is removed by etching.

13. The method for manufacturing a touch panel-attached display device according to claim 9, wherein, in the step of forming the second insulating film, by making the thickness of the second portion thinner than the thickness of the first portion, the electrostatic capacitance between the pixel electrode and the counter electrode is increased, compared with a provisional case where the thickness of the first portion is the same as the thickness of the second portion.

\* \* \* \* \*